(12) United States Patent
Asada

(10) Patent No.: US 12,442,988 B2
(45) Date of Patent: Oct. 14, 2025

(54) FERRULE AND FERRULE STRUCTURE

(71) Applicant: Fujikura Ltd., Tokyo (JP)

(72) Inventor: Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 198 days.

(21) Appl. No.: 18/036,593

(22) PCT Filed: Aug. 25, 2021

(86) PCT No.: PCT/JP2021/031231
§ 371 (c)(1),
(2) Date: May 11, 2023

(87) PCT Pub. No.: WO2022/158018
PCT Pub. Date: Jul. 28, 2022

(65) Prior Publication Data
US 2023/0408774 A1     Dec. 21, 2023

(30) Foreign Application Priority Data

Jan. 22, 2021   (JP) .................... 2021-008664

(51) Int. Cl.
*G02B 6/38*     (2006.01)
*G02B 6/40*     (2006.01)

(52) U.S. Cl.
CPC ........... *G02B 6/3861* (2013.01); *G02B 6/403* (2013.01)

(58) Field of Classification Search
CPC ................... G02B 6/3861; G02B 6/403
(Continued)

(56) References Cited

U.S. PATENT DOCUMENTS 5,602,951 A * 2/1997 Shiota ............... G02B 6/3839
                                                    385/71
2003/0133688 A1    7/2003 Wing Leung et al.
(Continued)

FOREIGN PATENT DOCUMENTS

CN        109716187 A        5/2019
CN        111279238 A        6/2020
(Continued)

OTHER PUBLICATIONS

International Search Report issued in corresponding International Application No. PCT/JP2021/031231, mailed Nov. 9, 2021, with translation (8 pages).

Primary Examiner — Jerry M Blevins
(74) Attorney, Agent, or Firm — Osha Bergman Watanabe & Burton LLP

(57) ABSTRACT

A ferrule includes a main body including inner and outer walls and a connection end surface at which a tip of an optical fiber is to be disposed. The inner wall has fiber holes. The ferrule includes an adhesive filling part disposed in the main body on an opposite side from the connection end surface with respect to the inner wall, an upper opening that opens from the outer wall to the adhesive filling part, and a lower opening that opens from the outer wall to the adhesive filling part and is disposed on an opposite side from the upper opening. The inner wall has a first surface and a second surface protruding toward the adhesive filling part from the first surface. The upper opening is opened in a location along the first surface. The lower opening is opened in a location along the second surface.

7 Claims, 18 Drawing Sheets

(58) Field of Classification Search
USPC .......................................................... 385/80
See application file for complete search history.

(56) References Cited

U.S. PATENT DOCUMENTS

| | | | |
|---|---|---|---|
| 2011/0013876 A1 | 1/2011 | Marcouiller et al. | |
| 2011/0262079 A1* | 10/2011 | Kato .................... | G02B 6/3865 |
| | | | 385/78 |
| 2017/0097473 A1* | 4/2017 | Newbury .............. | G02B 6/3885 |
| 2017/0371108 A1* | 12/2017 | Richmond ............ | G02B 6/3885 |
| 2018/0120516 A1* | 5/2018 | Nakama ............... | G02B 6/3885 |
| 2018/0267252 A1 | 9/2018 | Takano et al. | |

FOREIGN PATENT DOCUMENTS

| | | | | |
|---|---|---|---|---|
| JP | H02146508 A | | 6/1990 | |
| JP | H04235508 A | | 8/1992 | |
| JP | H0954225 A | * | 2/1997 | ............... G02B 6/40 |
| JP | H09054225 A | | 2/1997 | |
| JP | 2003131069 A | | 5/2003 | |
| JP | 3717553 B2 | | 11/2005 | |
| JP | 2007102114 A | | 4/2007 | |
| JP | 2009300577 A | | 12/2009 | |
| JP | 2013068976 A | | 4/2013 | |
| JP | 2015527619 A | | 9/2015 | |
| JP | 2018060040 A | | 4/2018 | |
| JP | 2018101023 A | | 6/2018 | |
| JP | 2019101233 A | | 6/2019 | |
| WO | 2016152246 A1 | | 9/2016 | |

* cited by examiner

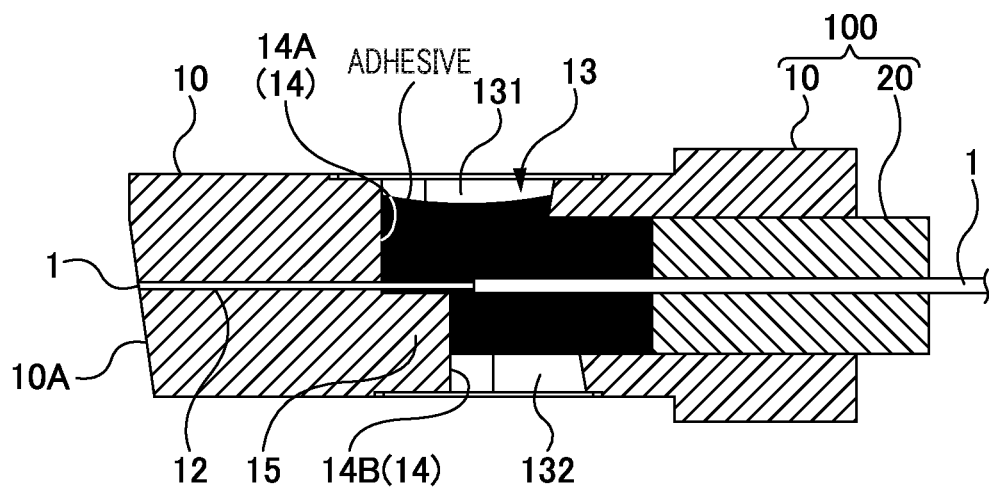
FIG. 3A (FIRST EMBODIMENT)
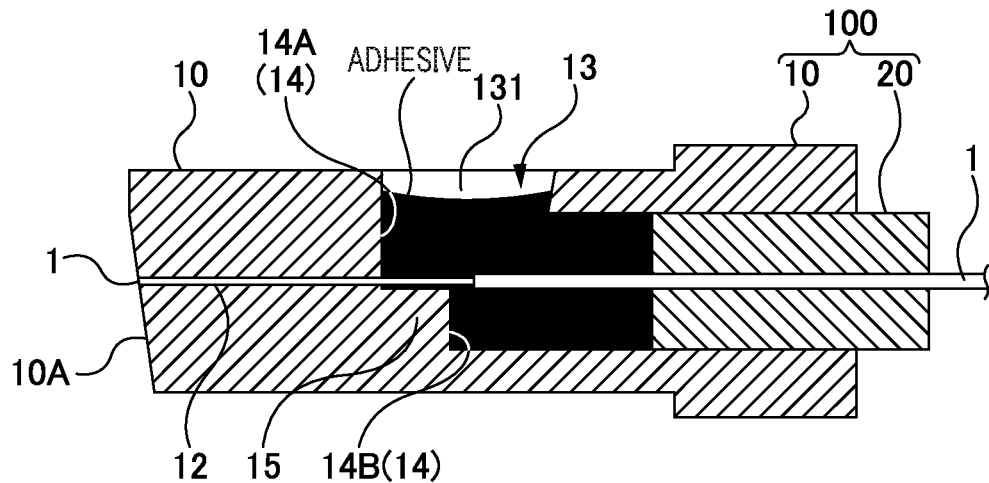
FIG. 3B (FIRST COMPARATIVE EXAMPLE)
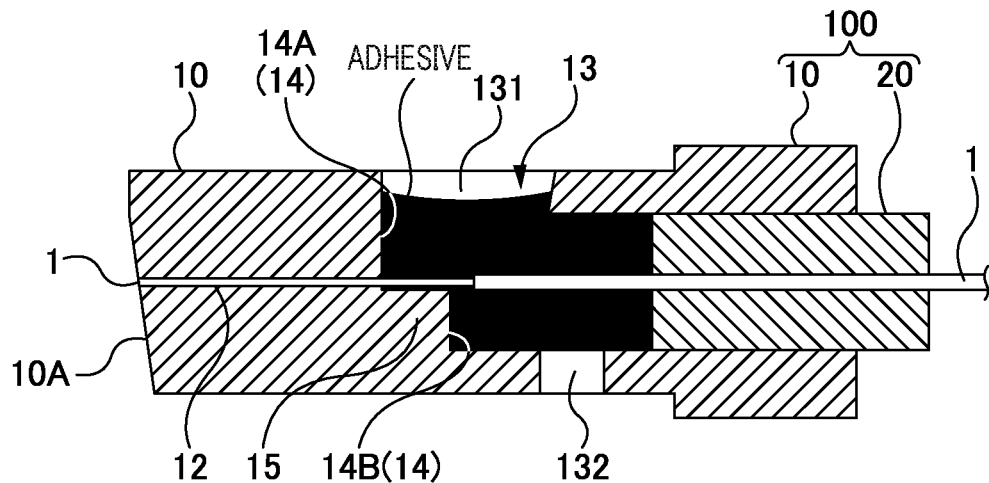
FIG. 3C (SECOND COMPARATIVE EXAMPLE)

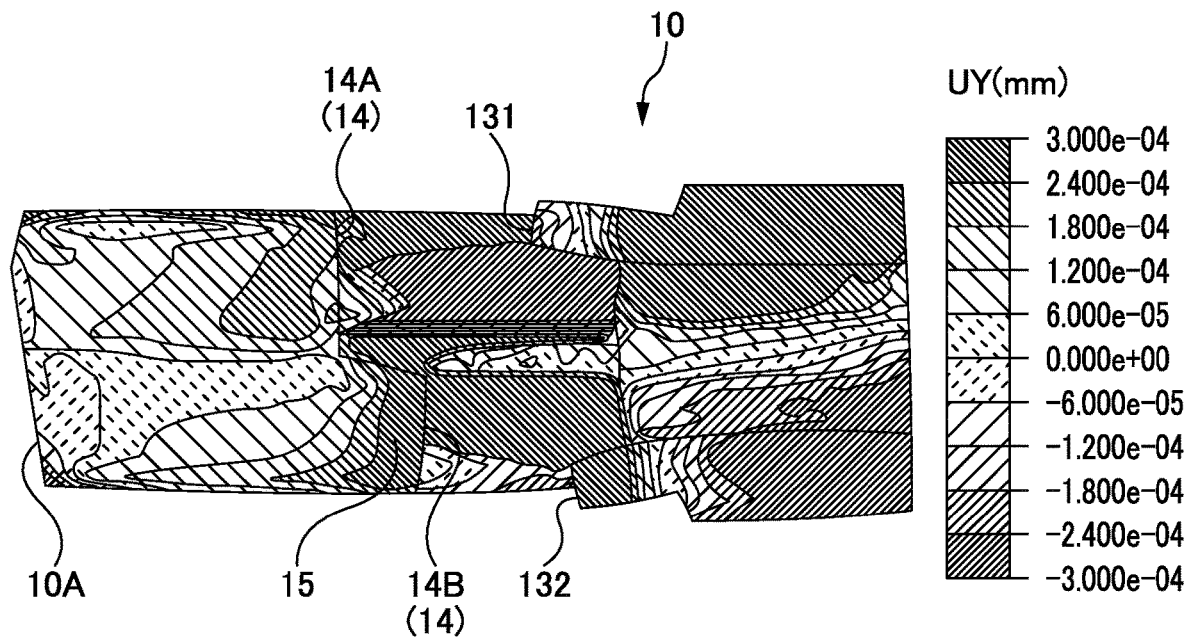
FIG. 4A (FIRST EMBODIMENT)
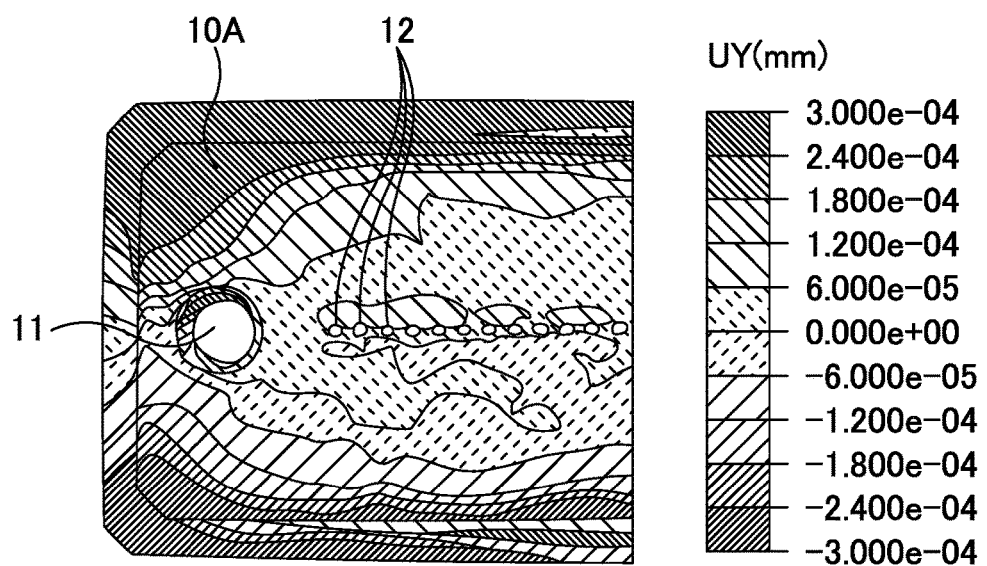
FIG. 4B (FIRST EMBODIMENT)

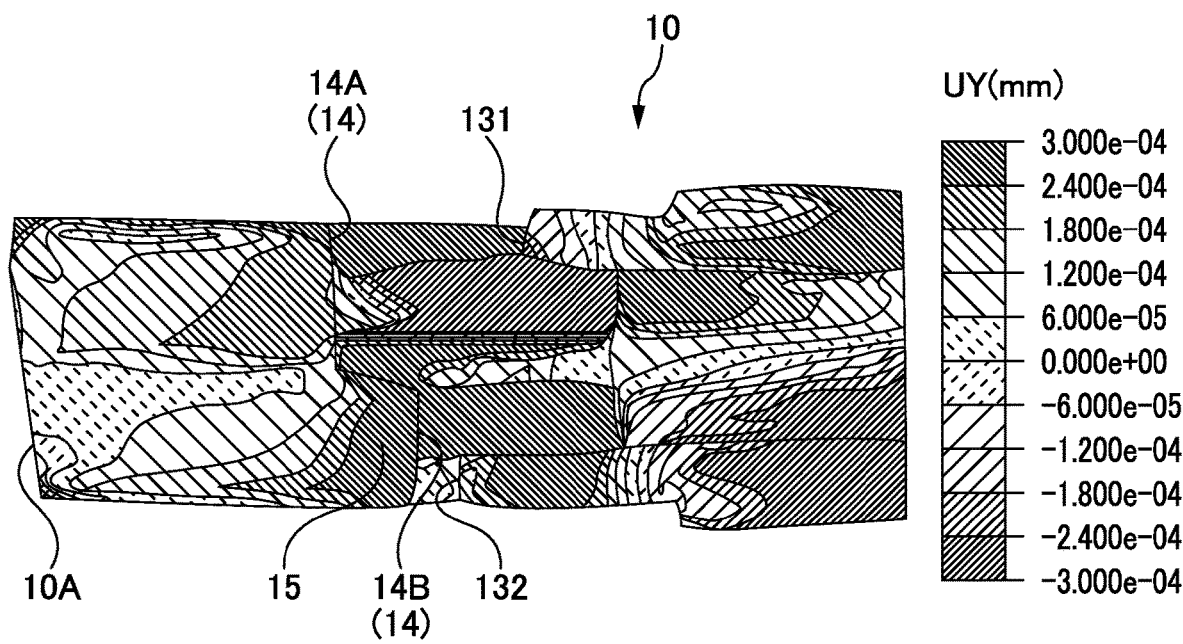
FIG. 5A (MODIFICATION)
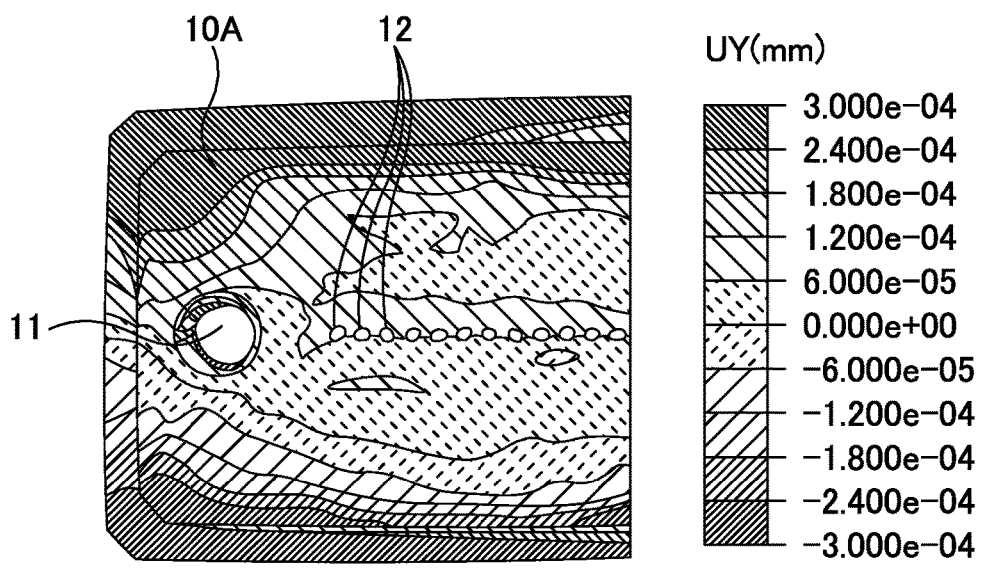
FIG. 5B (MODIFICATION)

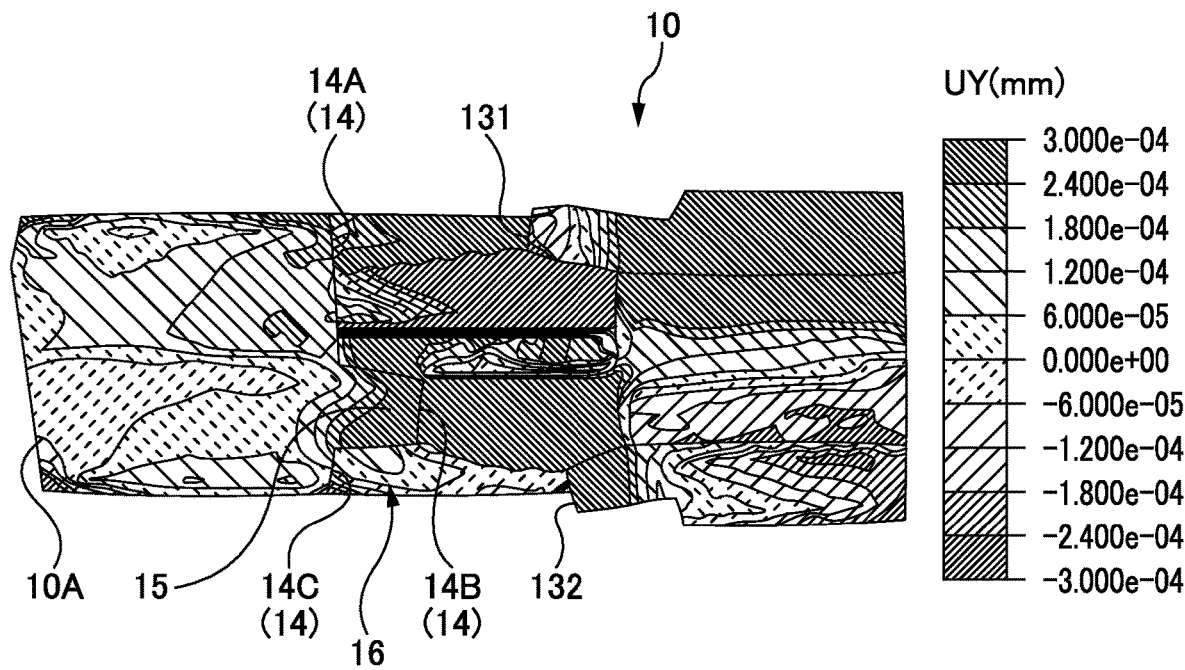
FIG. 7A (SECOND EMBODIMENT)
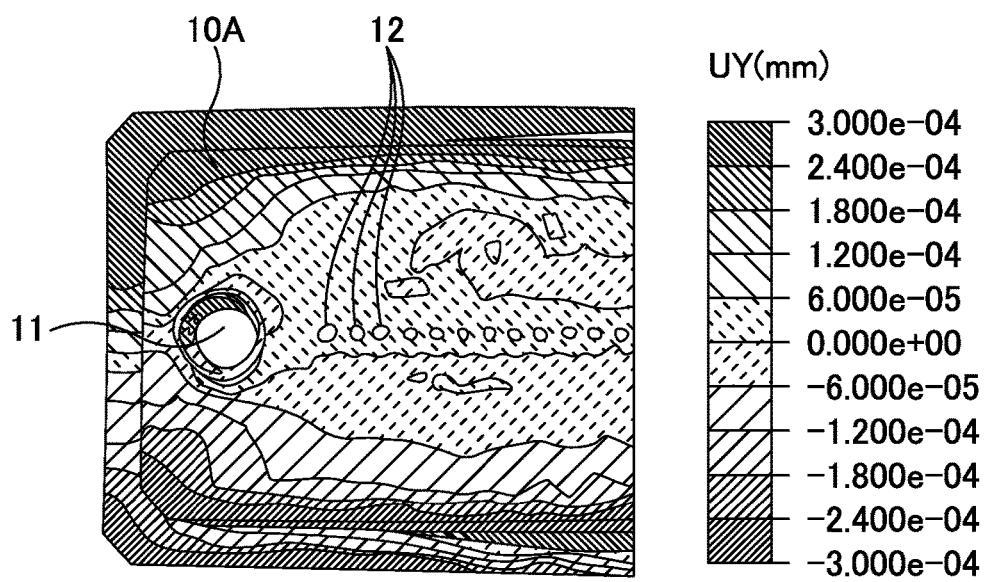
FIG. 7B (SECOND EMBODIMENT)

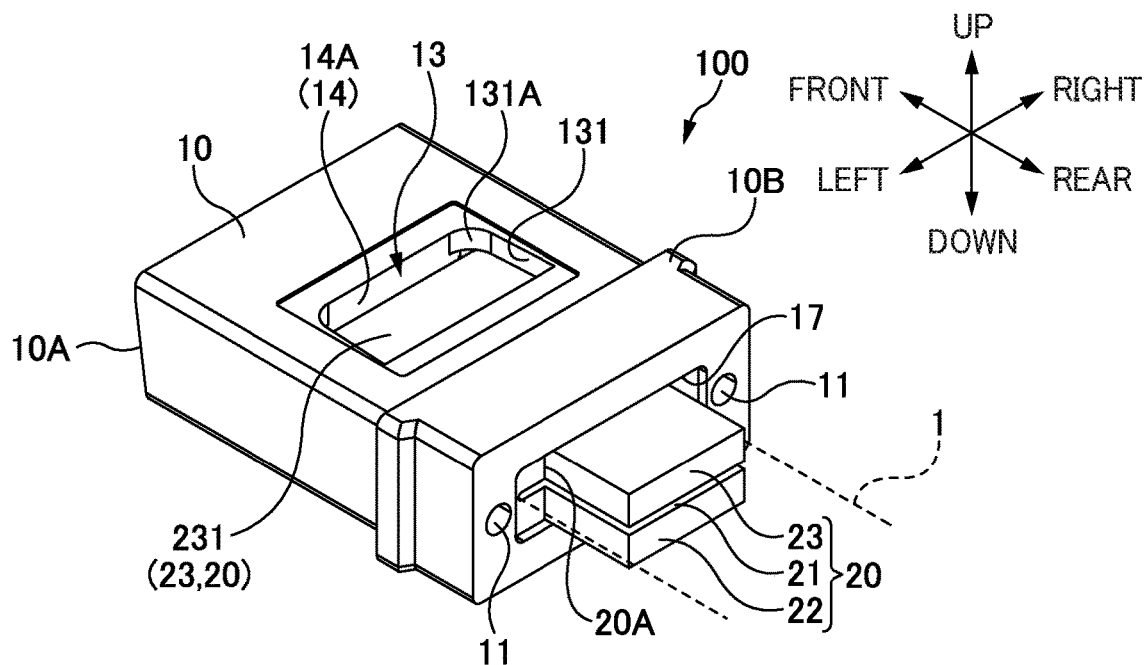
FIG. 8A (THIRD EMBODIMENT)
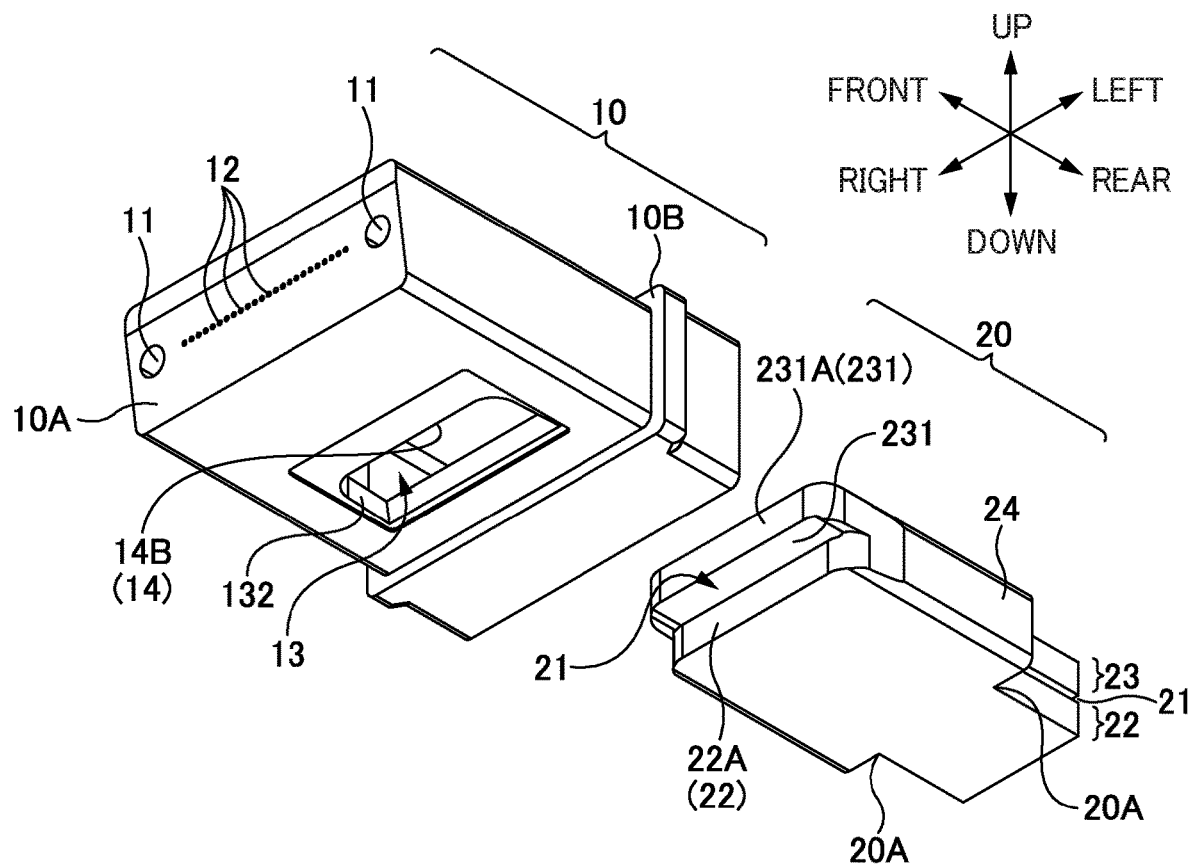
FIG. 8B (THIRD EMBODIMENT)

THIRD EMBODIMENT

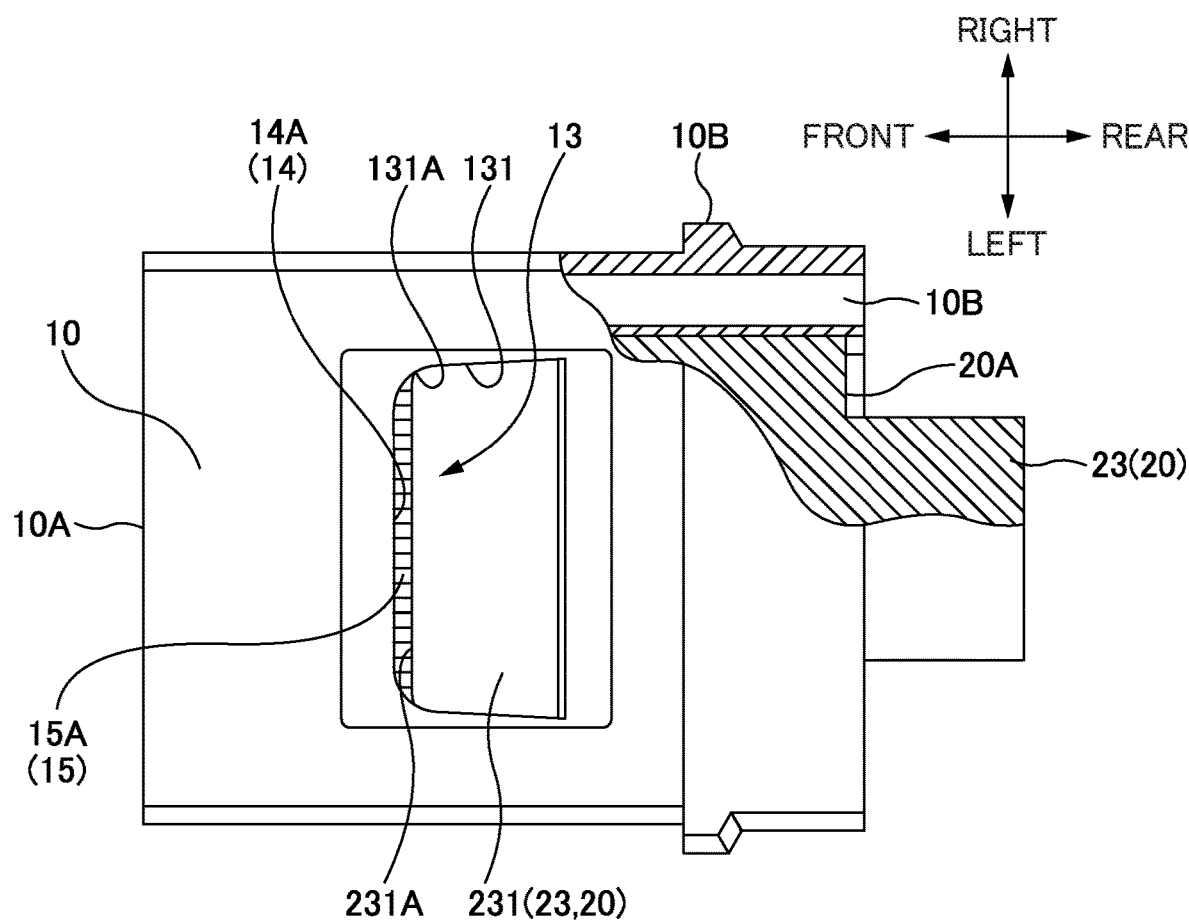
FIG. 10A (THIRD EMBODIMENT)
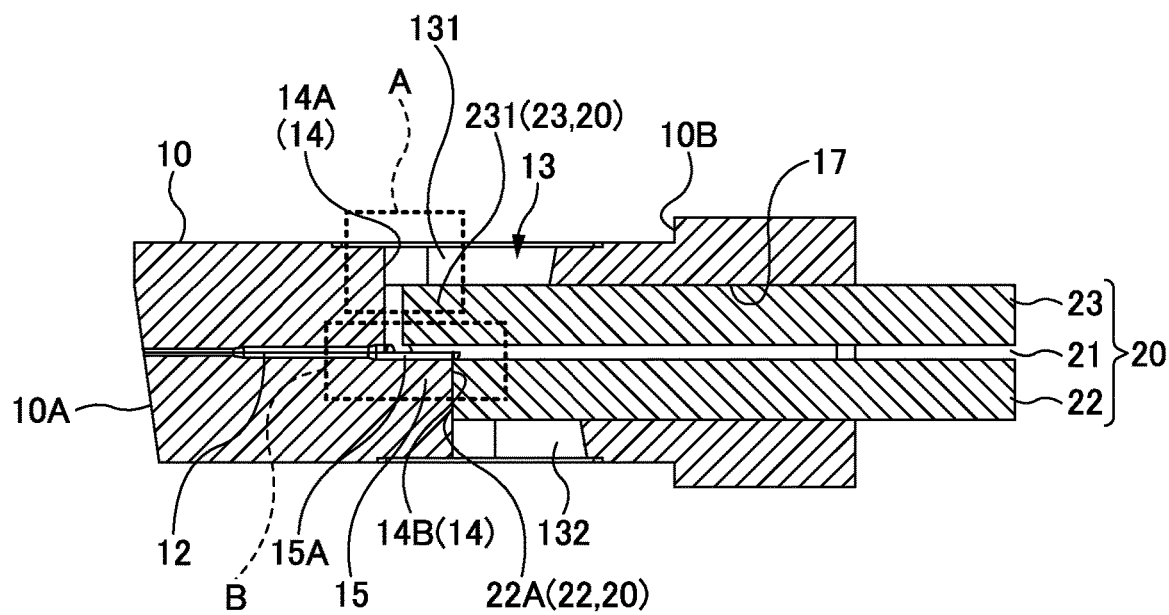
FIG. 10B (THIRD EMBODIMENT)

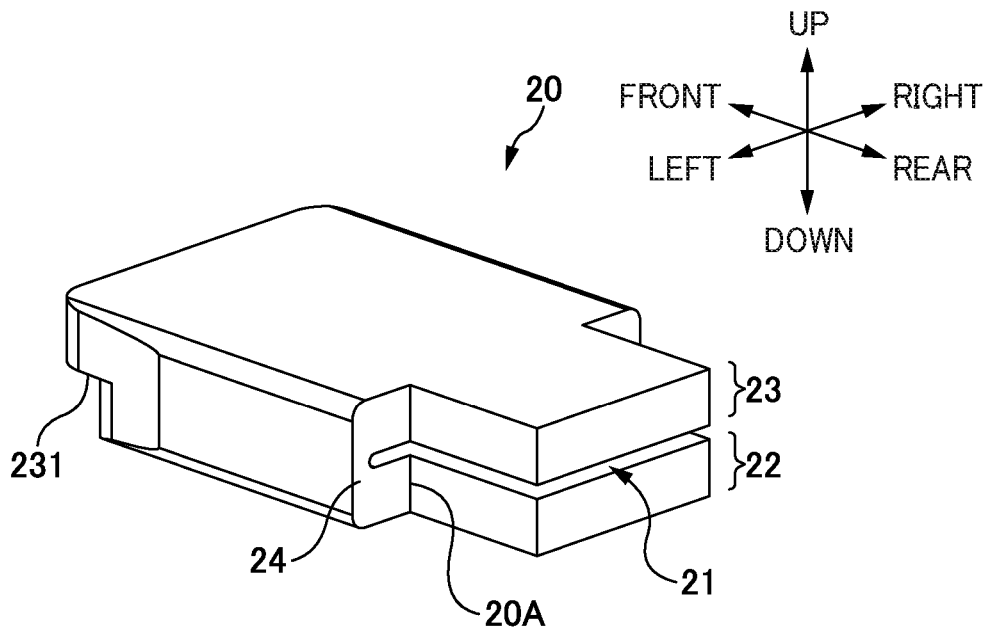
FIG. 12A (THIRD EMBODIMENT)
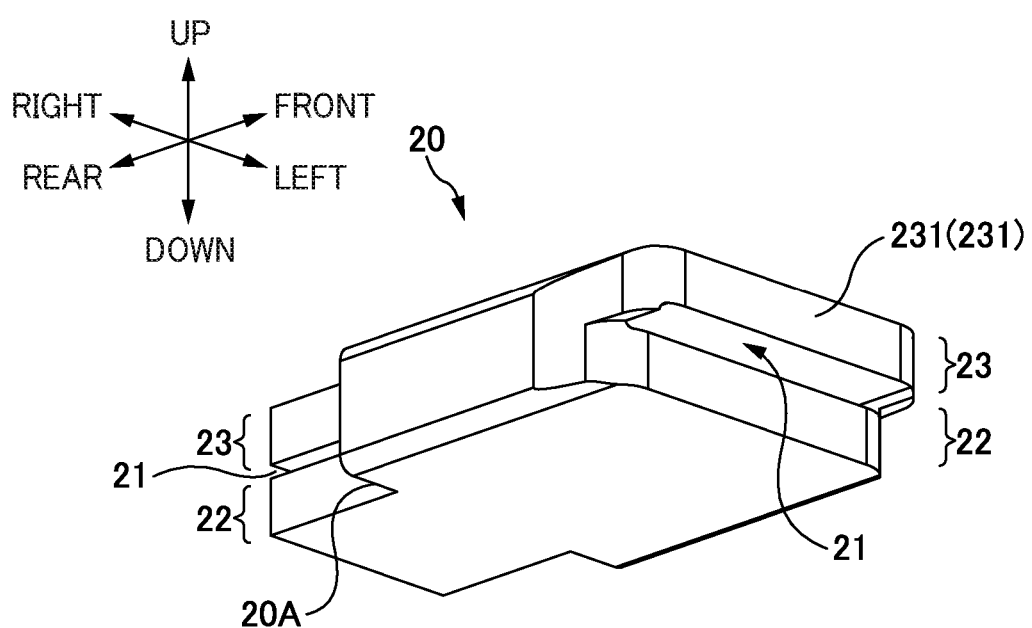
FIG. 12B (THIRD EMBODIMENT)

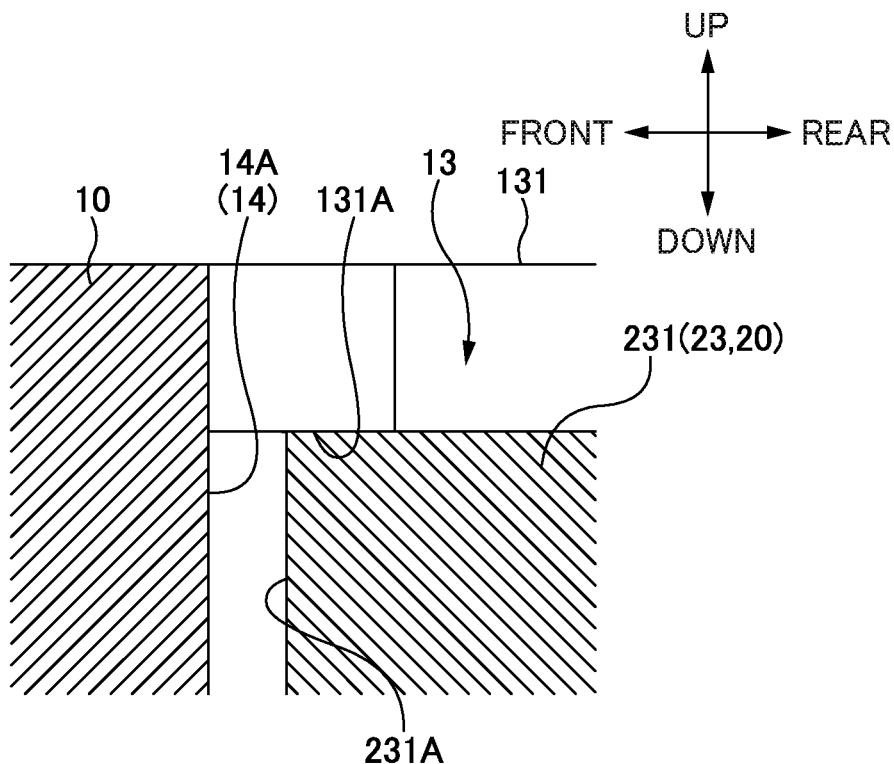
FIG. 13A (THIRD EMBODIMENT)
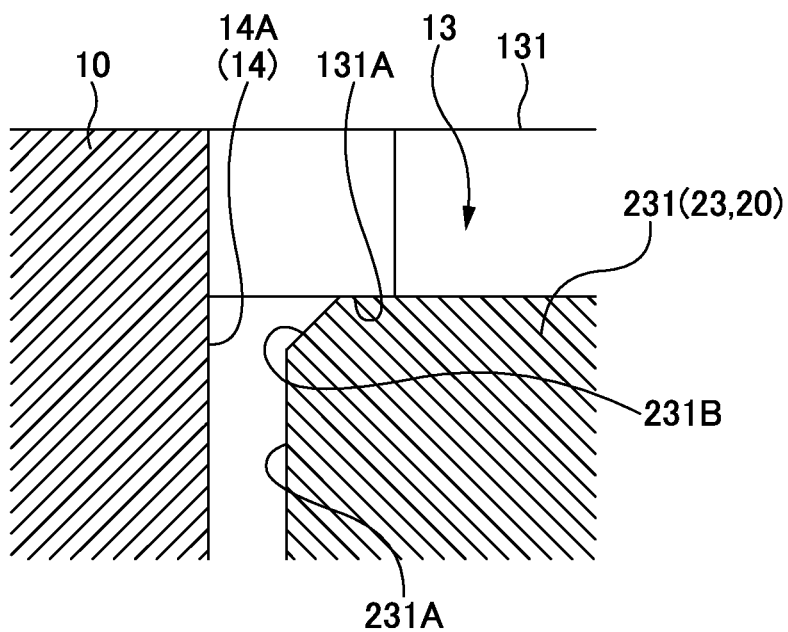
FIG. 13B (THIRD EMBODIMENT)

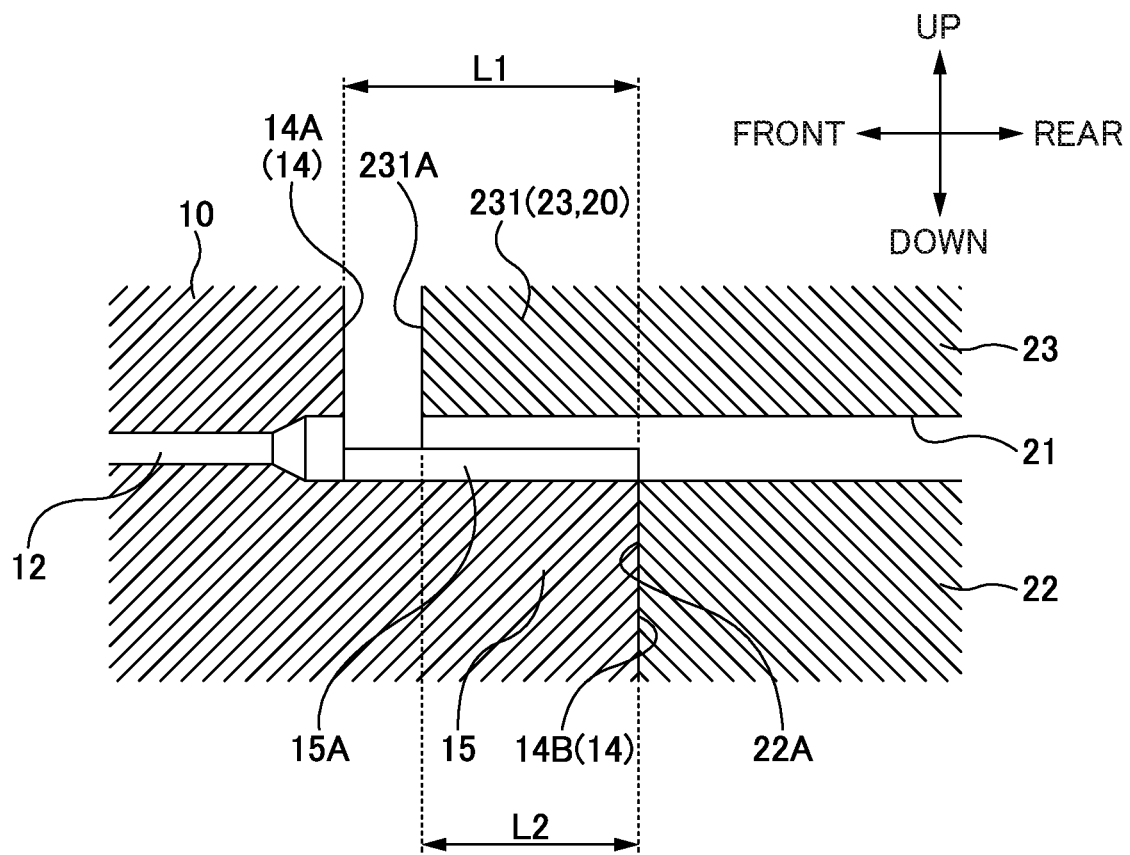
FIG. 14A (THIRD EMBODIMENT)
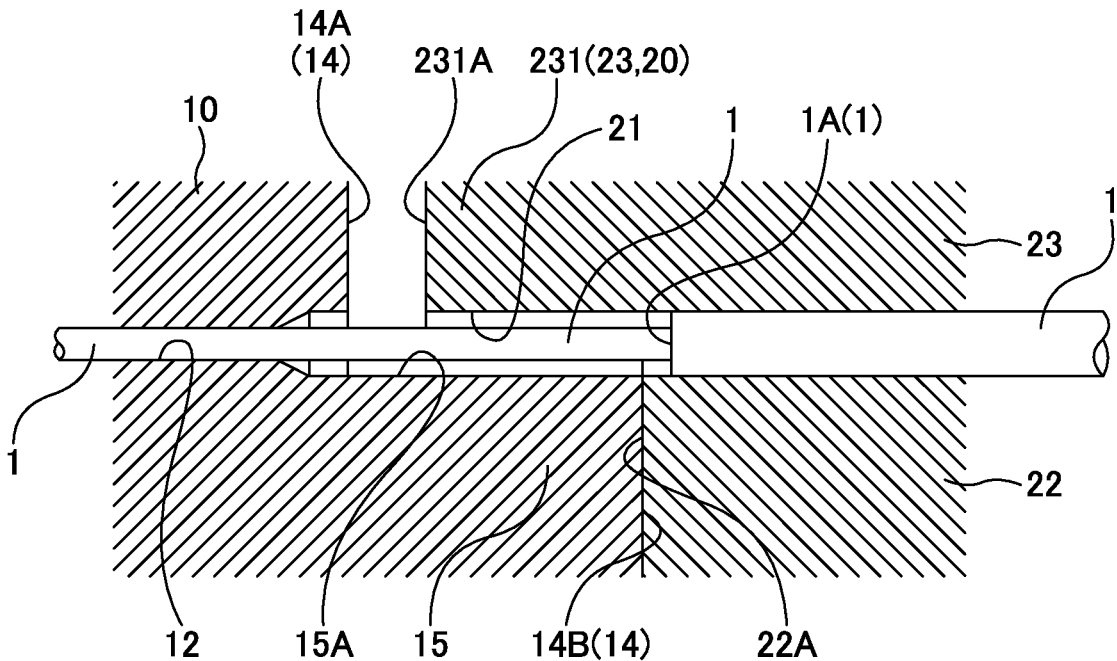
FIG. 14B (THIRD EMBODIMENT)

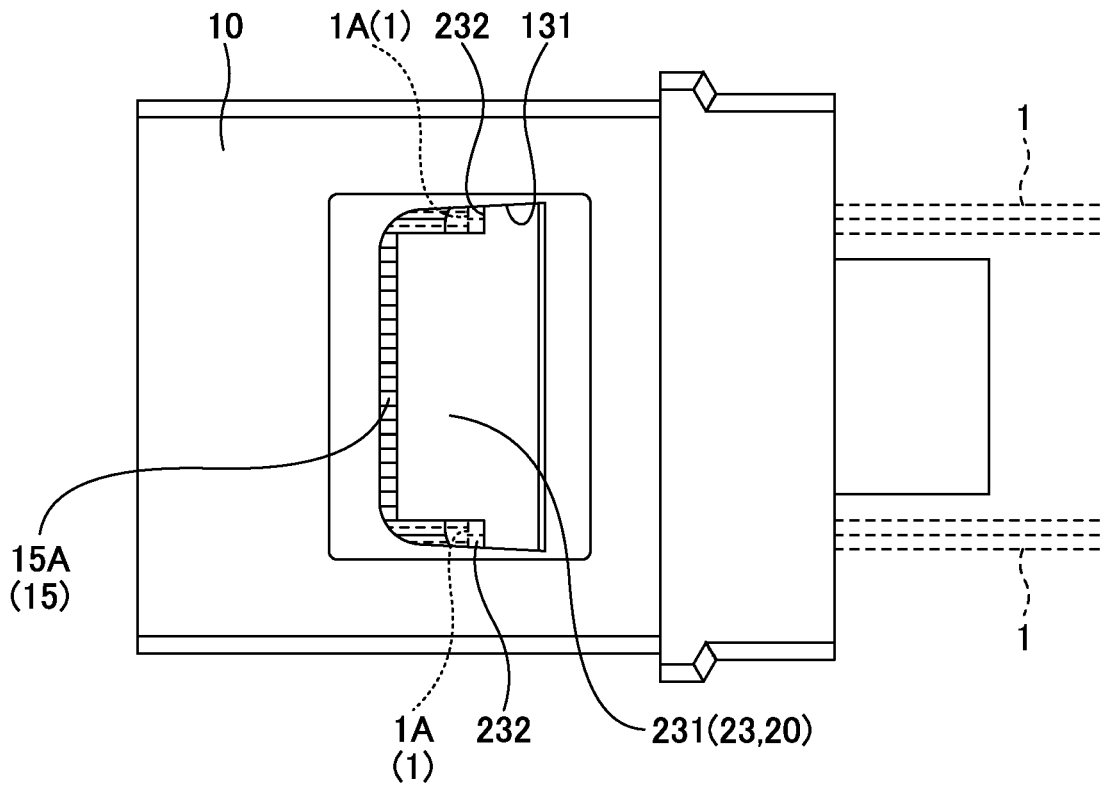
FIG. 15A (THIRD EMBODIMENT)
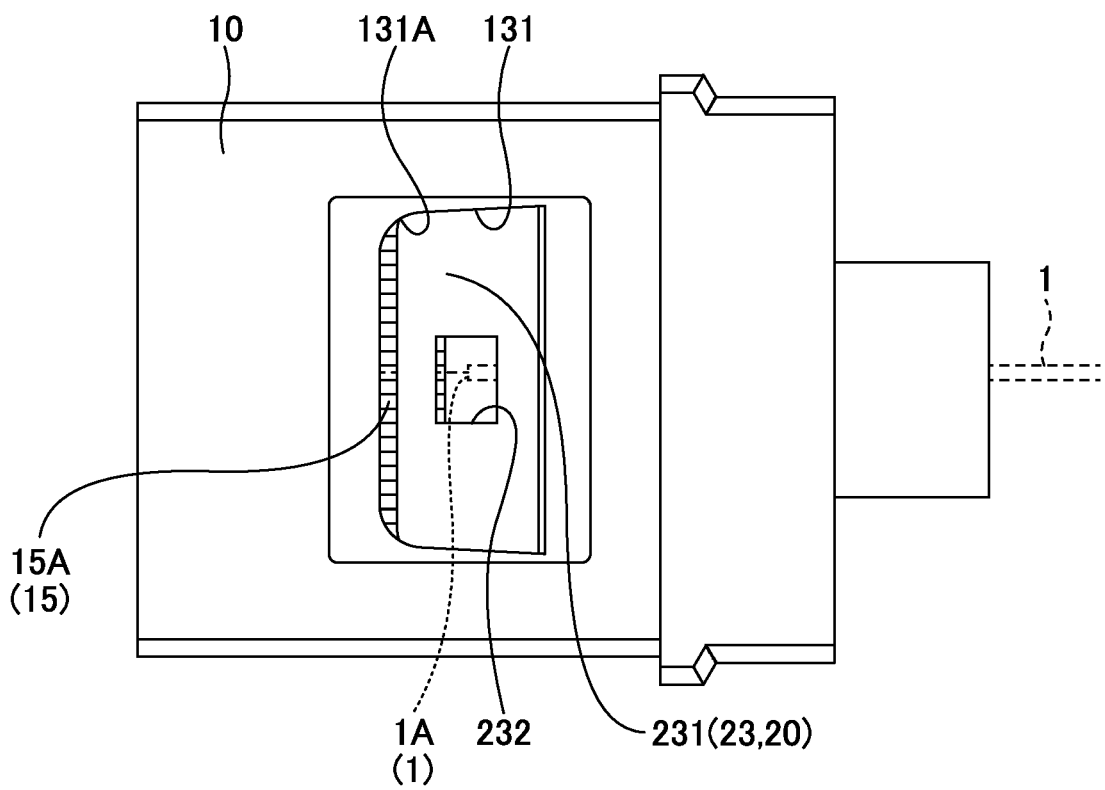
FIG. 15B (THIRD EMBODIMENT)

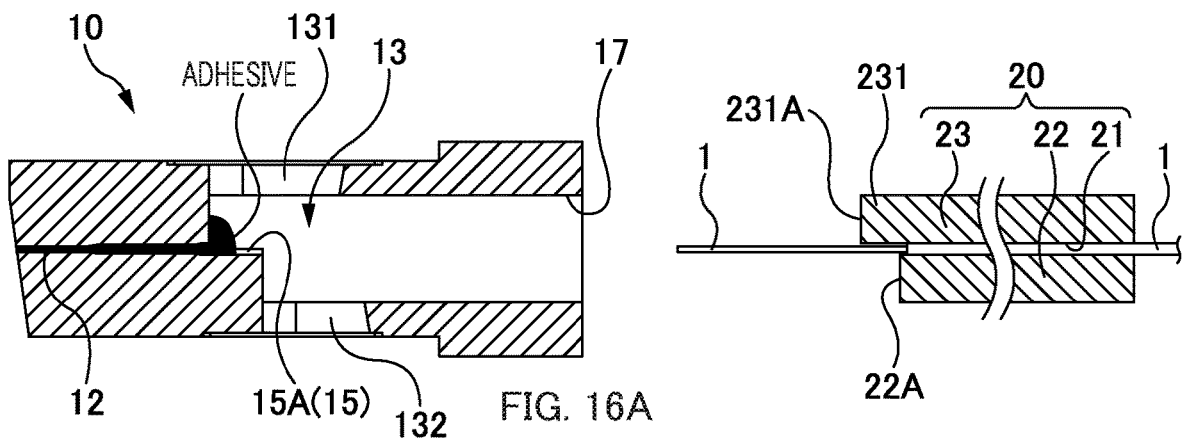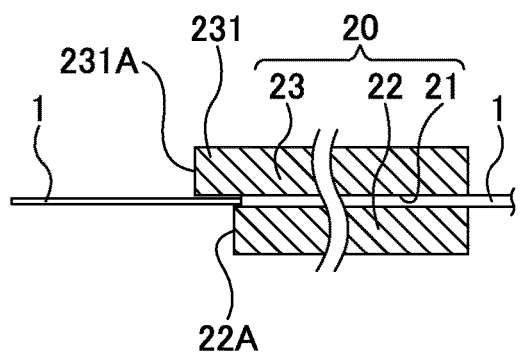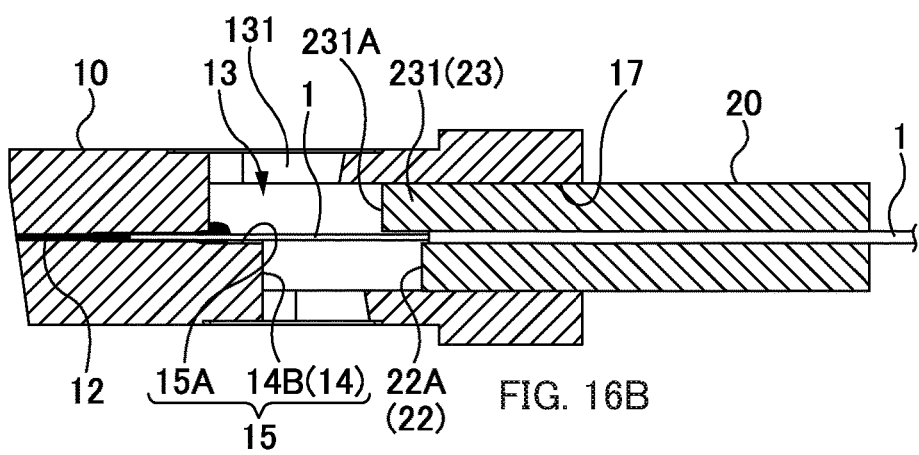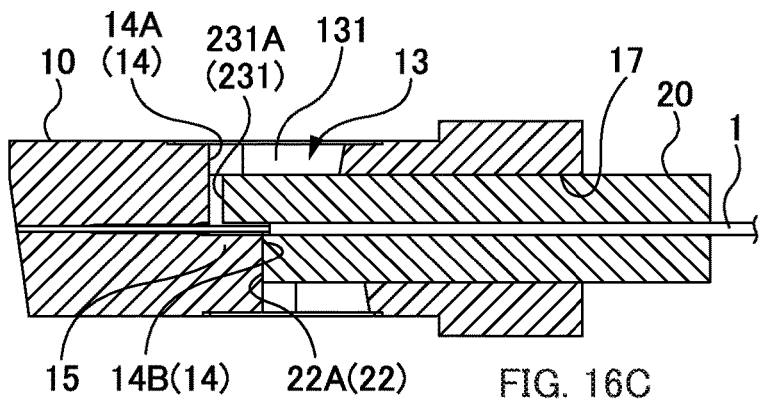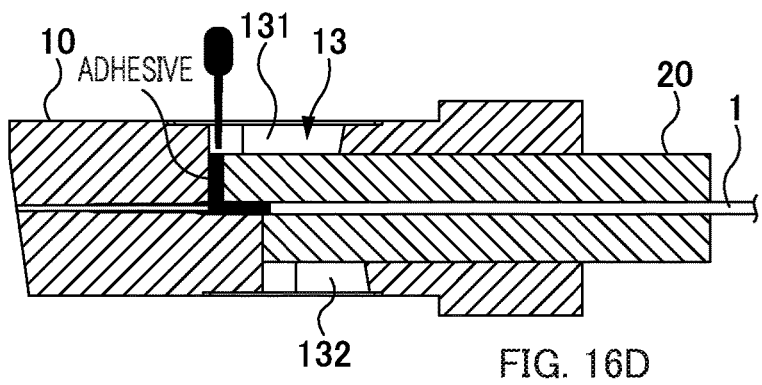
FIG. 16A
FIG. 16B
FIG. 16C
FIG. 16D

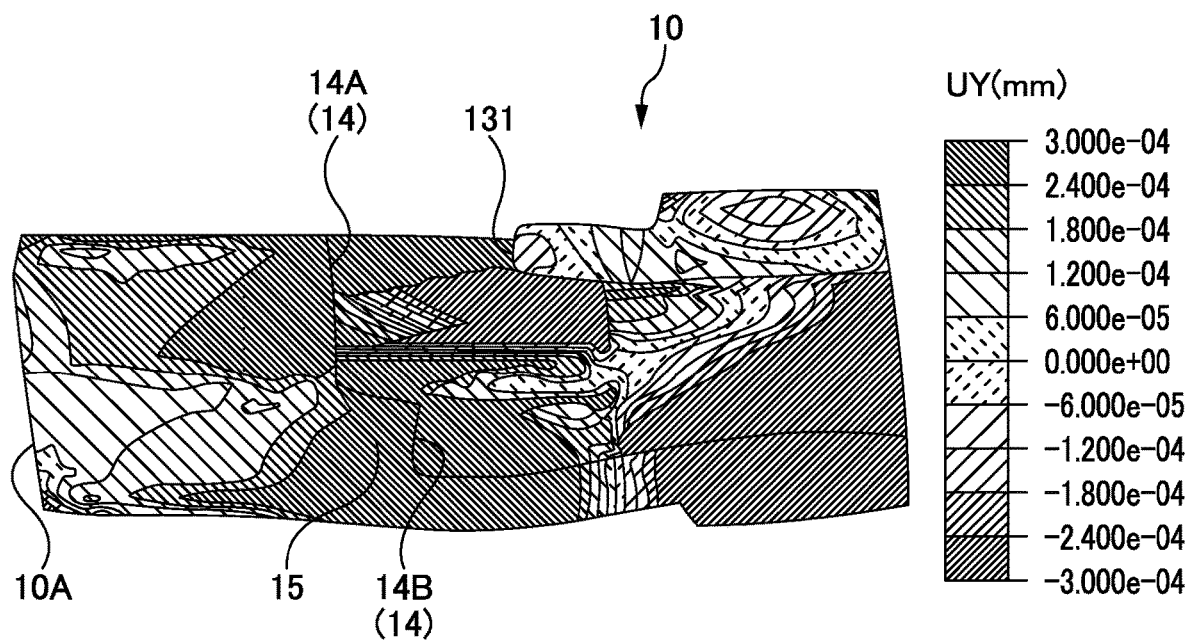
FIG. 17A (FIRST COMPARATIVE EXAMPLE)
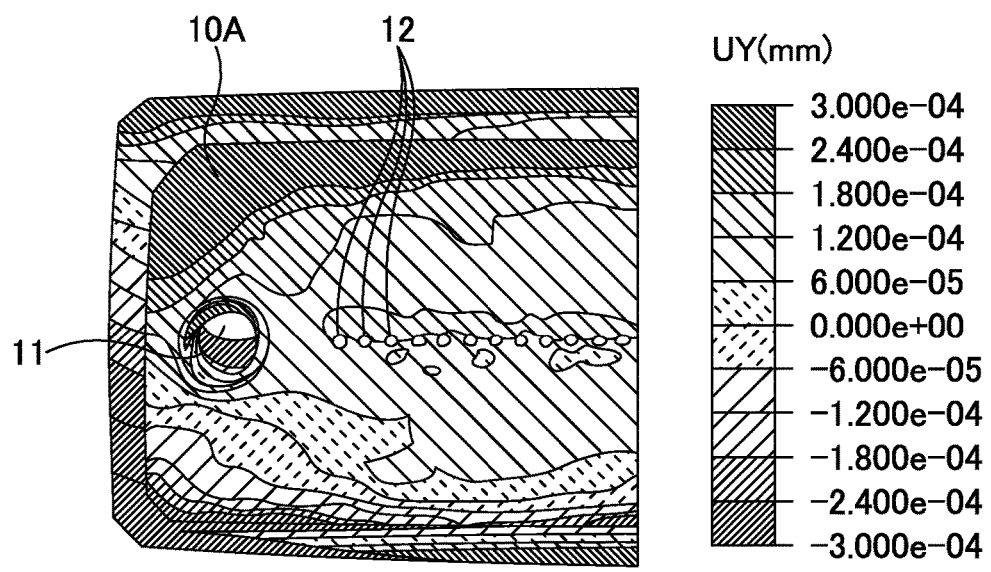
FIG. 17B (FIRST COMPARATIVE EXAMPLE)

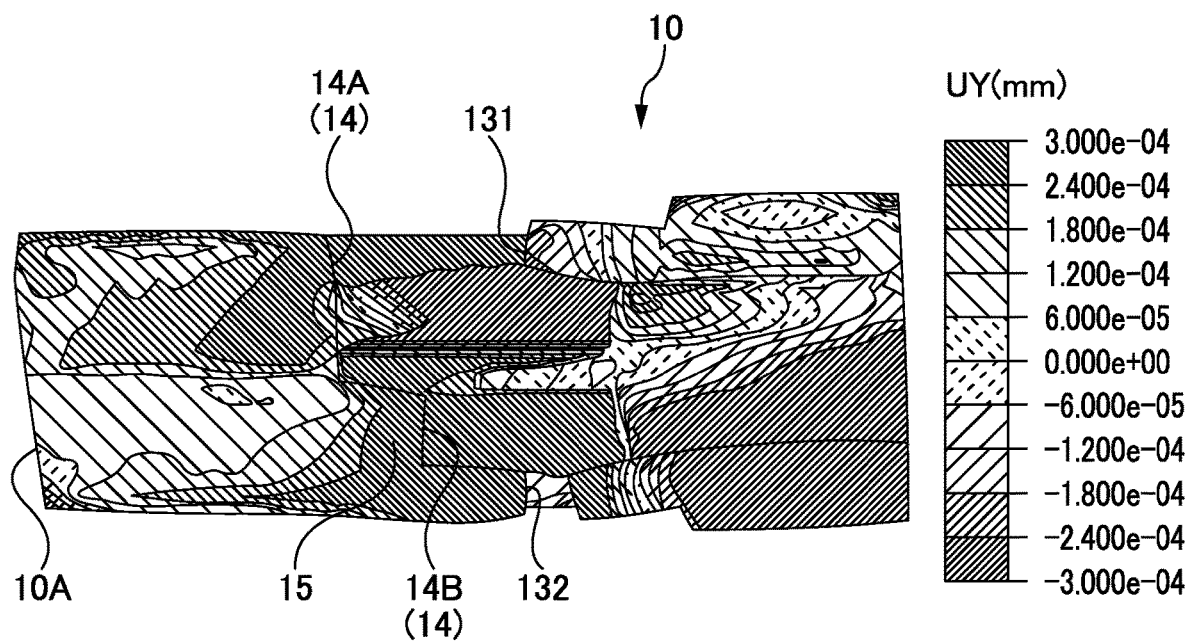
FIG. 18A (SECOND COMPARATIVE EXAMPLE)
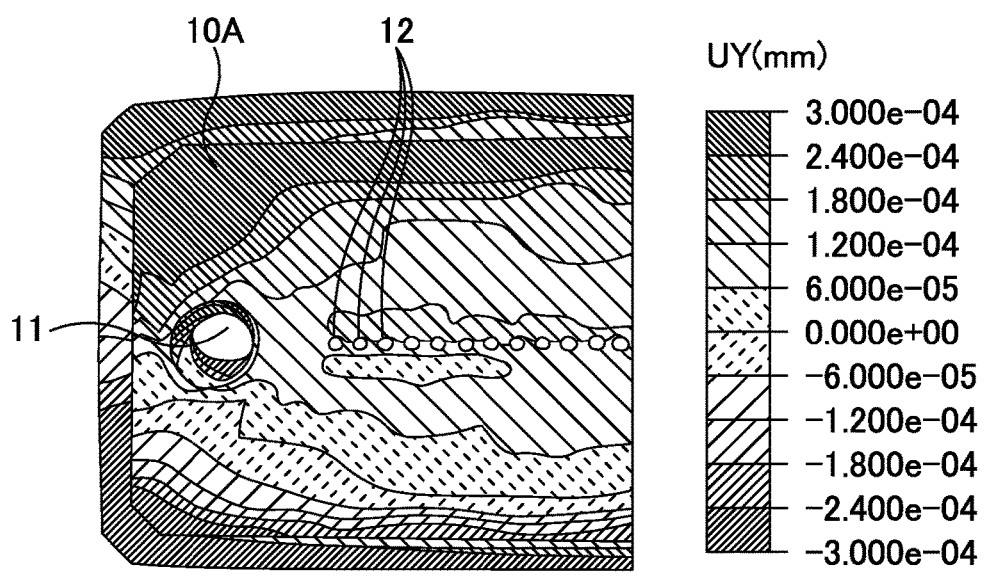
FIG. 18B (SECOND COMPARATIVE EXAMPLE)

FERRULE AND FERRULE STRUCTURE

BACKGROUND

Technical Field

The present disclosure relates to a ferrule and a ferrule structure.

Description of the Related Art

An MT ferrule is a known type of ferrule that collectively connects a plurality of optical fibers. Such a ferrule includes an adhesive filling part. The optical fibers are fixed to the ferrule by filling the adhesive filling part with an adhesive. For example, PTL 1 describes a ferrule that can be filled with an adhesive from an adhesive inlet.

PATENT LITERATURE

PTL 1: Japanese Patent Application Laid-open Publication No. 2003-131069

The ferrule may deform due to contraction of the adhesive filled in the ferrule. To deal with this, PTL 1 describes forming the ferrule's fiber holes, guide pin holes, etc., with a resin that is insert-molded in a metal frame. However, the ferrule described in PTL 1 has a complicated configuration and requires high manufacturing cost.

SUMMARY

One or more embodiments provide a new configuration that can suppress deformation of a ferrule.

A ferrule according to one or more embodiments includes: a main body including a connection end surface at which a tip of an optical fiber is to be disposed, and an outer wall; an inner wall including openings of a plurality of fiber holes, the fiber hole being configured to insert the optical fiber therethrough toward the connection end surface, the inner wall being disposed in the main body; an adhesive filling part configured to be filled with an adhesive, the adhesive filling part being disposed in the main body on an opposite side from the connection end surface with respect to the inner wall; an upper opening that opens through to the adhesive filling part from the outer wall; and a lower opening that opens through to the adhesive filling part from the outer wall, the lower opening being disposed on an opposite side from the upper opening. The inner wall has a first surface, and a second surface protruding toward the adhesive filling part from the first surface. The upper opening is opened in a location along the first surface. The lower opening is opened in a location along the second surface.

A ferrule according to one or more embodiments includes: a main body including a connection end surface at which a tip of an optical fiber is to be disposed, and an outer wall; an inner wall including openings of a plurality of fiber holes, the fiber hole being configured to insert the optical fiber therethrough toward the connection end surface, the inner wall being disposed in the main body; an adhesive filling part configured to be filled with an adhesive, the adhesive filling part being disposed in the main body on an opposite side from the connection end surface with respect to the inner wall; an upper opening that opens through to the adhesive filling part from the outer wall; and a lower opening that opens through to the adhesive filling part from the outer wall, the lower opening being disposed on an opposite side from the upper opening. The inner wall has: a first surface along an edge of the upper opening on a side of the connection end surface; a second surface protruding toward the adhesive filling part from the first surface; and a third surface disposed on an opposite side from the upper opening with respect to the second surface, the third surface being disposed on the side of the connection end surface with respect to the second surface.

Other features of one or more embodiments will become apparent from the following description of the present Specification and Drawings.

According to one or more embodiments, it is possible to suppress deformation of a ferrule.

BRIEF DESCRIPTION OF THE DRAWINGS

FIG. 3A is a cross-sectional view of a ferrule structure according to one or more embodiments.

FIG. 3B is a diagram illustrating a first comparative example.

FIG. 3C is a diagram illustrating a second comparative example.

FIG. 4A is an explanatory view of a simulation result of the deformation amount of a ferrule in a first example.

FIG. 4B is an explanatory view of the simulation result of the deformation amount of the ferrule in the first example.

FIG. 5A is an explanatory view of a simulation result of a ferrule in a modified example.

FIG. 5B is an explanatory view of the simulation result of the ferrule in the modified example.

FIG. 7A is an explanatory view of a simulation result of the deformation amount of the ferrule in the second example.

FIG. 7B is an explanatory view of the simulation result of the deformation amount of the ferrule in the second example.

FIG. 8A is a perspective view of a ferrule structure in a third example.

FIG. 8B is an exploded explanatory view of the ferrule structure in the third example.

FIG. 10A is a top view of the ferrule structure in the third example.

FIG. 10B is a cross-sectional view of the ferrule structure in the third example.

FIG. 12A is a perspective view of the boot alone.

FIG. 12B is a perspective view of the boot alone.

FIG. 13A is an enlarged cross-sectional view of the vicinity of a clearance between an end surface of a protrusion part and a first surface of the ferrule.

FIG. 13B is an explanatory view of the protrusion part in a modified example.

FIG. 14A is an enlarged view of the vicinity of a front end of a fiber insertion hole.

FIG. 14B is an enlarged view of the vicinity of the front end of the fiber insertion hole in a state where an optical fiber is inserted.

FIG. 15A is an explanatory view of an exposing part.

FIG. 15B is an explanatory view of an exposing part.

FIG. 16A is an explanatory view of a method for manufacturing a ferrule-equipped fiber.

FIG. 16B is an explanatory view of the method for manufacturing the ferrule-equipped fiber.

FIG. 16C is an explanatory view of the method for manufacturing the ferrule-equipped fiber.

FIG. 16D is an explanatory view of the method for manufacturing the ferrule-equipped fiber.

FIG. 17A is an explanatory view of a simulation result of the deformation amount of the ferrule in the first comparative example.

FIG. 17B is an explanatory view of the simulation result of the deformation amount of the ferrule in the first comparative example.

FIG. 18A is an explanatory view of a simulation result of the deformation amount of the ferrule in the second comparative example.

FIG. 18B is an explanatory view of the simulation result of the deformation amount of the ferrule in the second comparative example.

DESCRIPTION OF THE EMBODIMENTS

Embodiments are described according to the following descriptions of the specification and the drawings.

First Example

Figure 1A:
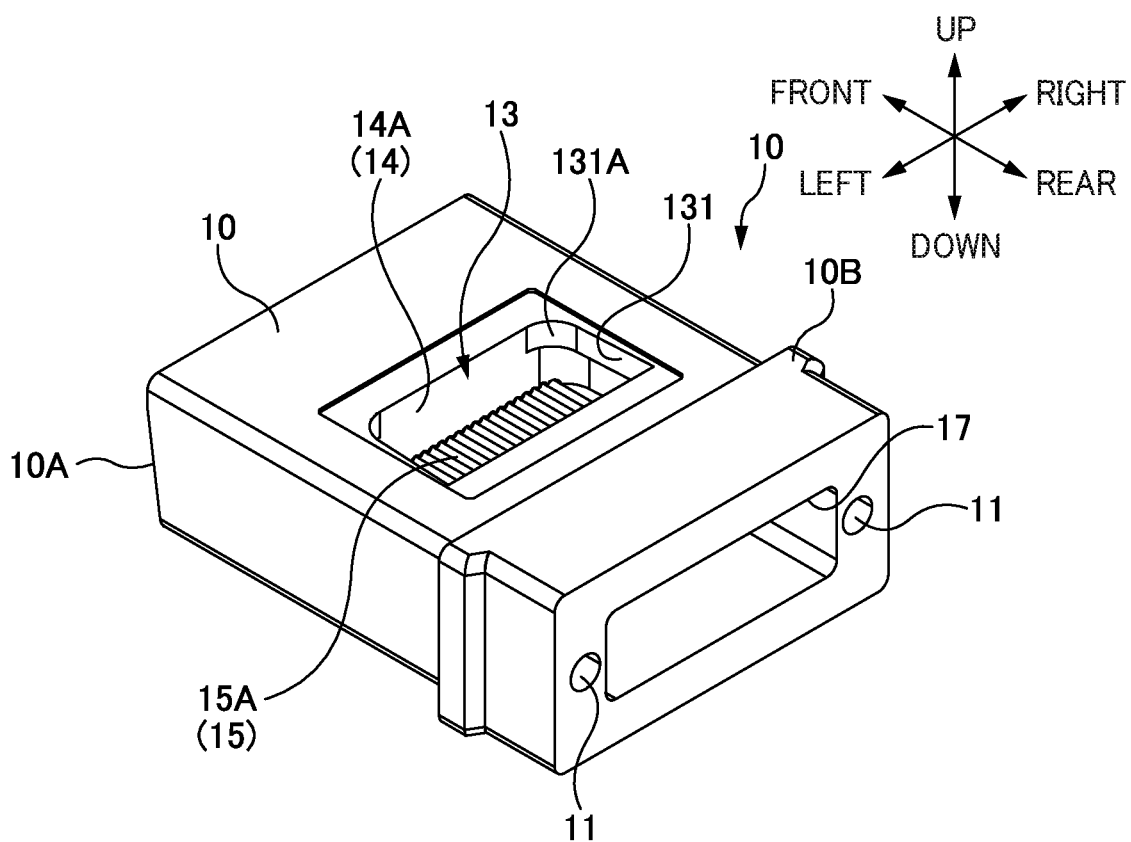
FIG. 1A is a perspective view of a ferrule according to one or more embodiments.
Figure 1B:
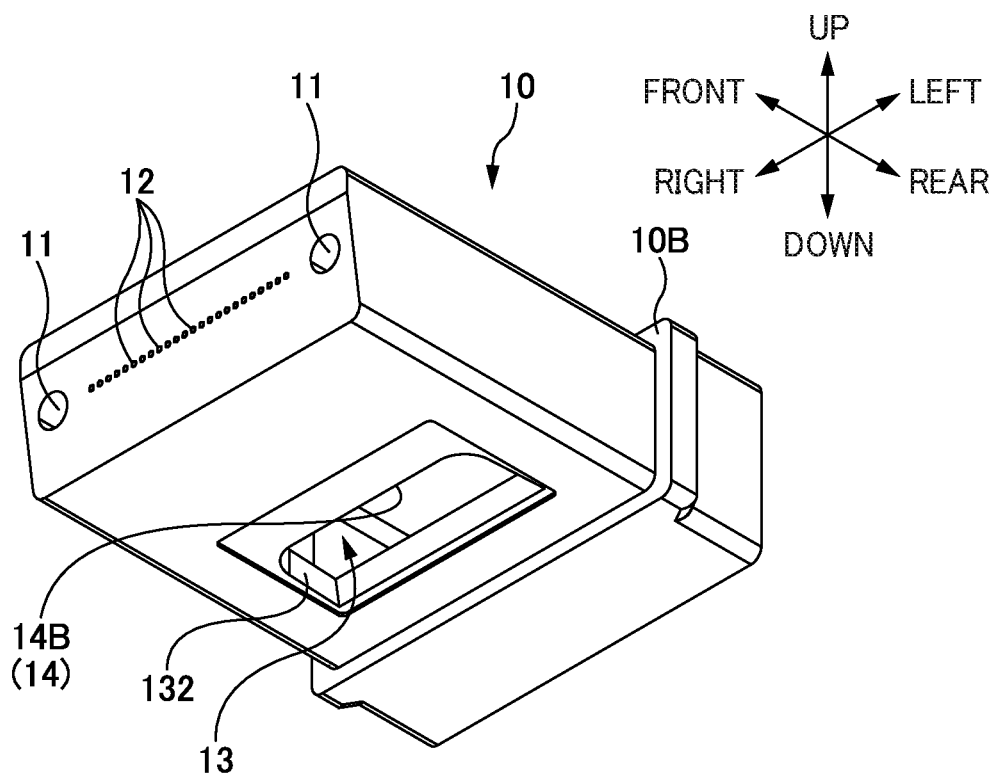
FIG. 1B is a perspective view of the ferrule according to one or more embodiments.
Figure 2:
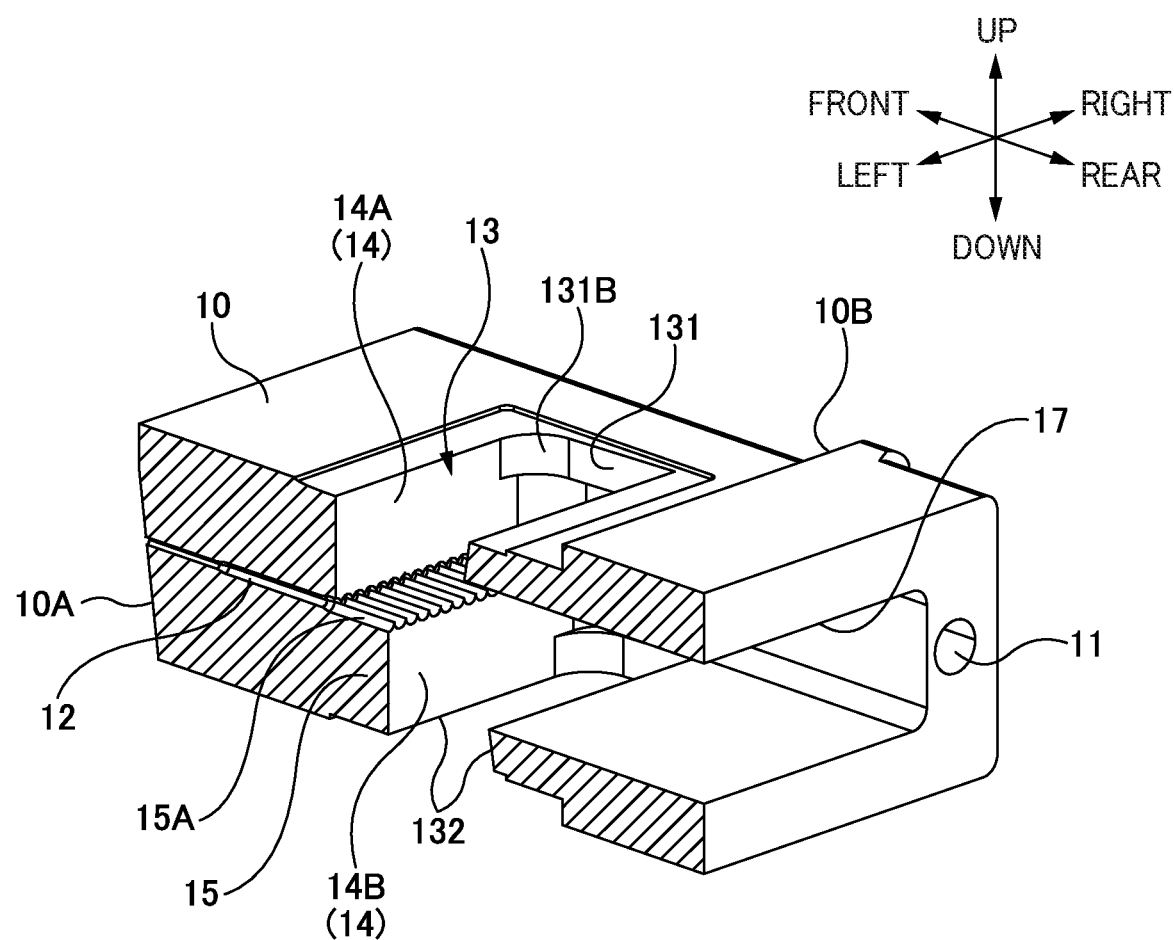
FIG. 2 is a cross-sectional perspective view of the ferrule.

FIGS. 1A and 1B are perspective views of a ferrule 10. FIG. 2 is a cross-sectional perspective view of the ferrule 10. FIG. 3A is a cross-sectional view of a ferrule structure 100. Note that, FIG. 3B is a diagram illustrating a first comparative example, and FIG. 3C is a diagram illustrating a second comparative example.

In the following description, directions are defined as follows. The direction in which an optical fiber 1 (see FIG. 3A) is inserted into a ferrule 10 is defined as the "fiber insertion direction" or "front-rear direction", and with reference to the optical fiber 1 inserted into the ferrule 10, the tip end side of the optical fiber 1 is defined as "front" while the opposite side therefrom is defined as "rear". Note that, the optical axis direction of the optical fiber 1 inserted into the ferrule 10 (the direction of the longitudinal axis) coincides with the fiber insertion direction (or the front-rear direction). The direction in which a plurality of optical fibers 1 inserted into the ferrule 10 are arrayed—i.e., the direction orthogonal to the optical axis direction (the direction of the longitudinal axis)—is defined as the "width direction" or "left-right direction", and the right side when viewing from the rear side to the front side is defined as "right" while the opposite side therefrom is defined as "left". The direction perpendicular to the fiber insertion direction (the front-rear direction) and the width direction (the left-right direction)—i.e., the direction orthogonal to a plane formed by the optical axis direction (the direction of the longitudinal axis) and the width direction—is defined as the "up-down direction", and the side of an opening (upper opening 131) for filling an adhesive filling part 13 with an adhesive is defined as "up" while the opposite side therefrom is defined as "down". Note that, the upper side may be referred to as the "filling window side", and the lower side may be referred to as the "bottom side".

The ferrule structure 100 (see FIG. 3A) includes a ferrule 10 and a boot 20. Note that, a member including optical fibers 1 fixed to the ferrule structure 100 may be referred to as a "ferrule-equipped fiber".

The ferrule 10 is a member that holds respective end parts of a plurality of optical fibers 1. The ferrule 10 in one or more embodiments is an MT connector (an MT ferrule) defined by JIS C 5981 and IEC 61754-5. A main body of the ferrule 10 includes a connection end surface 10A and an outer wall. The connection end surface 10A is the end surface of the ferrule 10 on the front side, and is an end surface to be connected to a mating ferrule (not illustrated herein). The outer wall constitutes outer surfaces that are contiguous to the connection end surface 10A (i.e., outer surfaces of the main body of the ferrule 10 located mainly on the upper, lower, left, and right sides). A flange part 10B (a rim part) protruding outward from the side surfaces of the main body of the ferrule 10 is disposed in a rear part of the ferrule 10. A pair of guide holes 11 is disposed in the right and left of the ferrule 10.

The ferrule 10 in one or more embodiments includes a plurality of fiber holes 12, an adhesive filling part 13, an inner wall 14, a stepped part 15, and a boot insertion port 17.

The fiber holes 12 are holes for inserting end parts of the optical fibers 1. The end part of each optical fiber 1 is fixed to the corresponding fiber hole 12, respectively. The plurality of fiber holes 12 are disposed side by side in the width direction (disposed so as to be arrayed in one direction) Here, twenty-four fiber holes 12 are arrayed in a single row in the width direction. However, the number of the fiber holes 12 is not limited to twenty-four. Also, the fiber holes 12 may be arrayed in a single row, or in two or more rows. One end part (the rear end) of the fiber hole 12 opens in the inner wall 14 (more specifically, a first surface 14A) of the adhesive filling part 13. The other end part (the front end) of the fiber hole 12 opens in the connection end surface 10A of the ferrule 10. Note that, the fiber holes 12 are in communication with guide grooves 15A described below.

The adhesive filling part 13 is a part (a space) that is configured to be filled with an adhesive. An upper opening 131 (an adhesive-filling window) is located in an upper surface of the ferrule 10. The upper opening 131 is an opening that opens through to the adhesive filling part 13 from the outer wall of the ferrule 10. The adhesive filling part 13 is filled with an adhesive from this upper opening 131. Additionally, a lower opening 132 is located in a lower surface of the ferrule 10. The lower opening 132 is an opening that opens through to the adhesive filling part 13 from the outer wall of the ferrule 10. The lower opening 132 is disposed on the opposite side from the upper opening 131. As described later, by providing these openings in the upper surface and lower surface of the ferrule 10, it is possible to suppress distortion of the ferrule 10 due to contraction that occurs with hardening of the adhesive.

The inner wall 14 includes respective openings of the plurality of fiber holes 12, and is disposed in the main body of the ferrule 10. A space disposed on the opposite side from the connection end surface 10A with respect to the inner wall 14 is the adhesive filling part 13. In other words, the inner wall 14 is a wall surface, among the wall surfaces constituting the adhesive filling part 13, that is on the side of the connection end surface 10A (i.e., the front side of the adhesive filling part 13; the side where the fiber holes 12 open). In one or more embodiments, the inner wall 14 has a first surface 14A and a second surface 14B. The first surface 14A is disposed along an edge of the upper opening 131 on the side of the connection end surface 10A (the front side). The upper opening 131 is opened at the location along the first surface 14A. The second surface 14B is a surface that protrudes toward the adhesive filling part 13 (toward the rear side) from the first surface 14A, and is the rear end surface of the stepped part 15. In the first example, the second surface 14B is a surface along an edge of the lower opening 132 on the side of the connection end surface 10A (the front side). The lower opening 132 is opened at the location along the second surface 14B.

The stepped part 15 is a step located inside the adhesive filling part 13 and is configured to guide the optical fibers 1 to the fiber holes 12. A plurality of guide grooves 15A are disposed on an upper surface of the stepped part 15. The guide grooves 15A are grooves for guiding the optical fibers 1 to the fiber holes 12. The guide grooves 15A are grooves along the fiber insertion direction (the front-rear direction). The plurality of guide groove 15A are disposed side by side so as to be arrayed in the width direction. The guide grooves 15A herein are formed as round grooves with a semi-circular cross section. However, the guide grooves 15A may be in another shape such as a V groove, a round groove with a semi-circular cross section, a U groove, or a rectangular groove, for example. Note that, the upper surface of the stepped part 15 does not have to include the guide grooves 15A. Front ends of the guide grooves 15A reach the inner wall 14 (specifically, the first surface 14A) on the front side of the adhesive filling part 13. The front ends of the guide grooves 15A are in communication with the openings of the fiber holes 12. Rear ends of the guide grooves 15A reach the second surface 14B, which is the rear end surface of the stepped part 15. The rear end surface (the second surface 14B) of the stepped part 15 is formed as a surface perpendicular to the fiber insertion direction.

The boot insertion port 17 is an opening for inserting the boot 20. The boot insertion port 17 is located at a rear end of the ferrule 10. The boot insertion port 17 is in communication with the adhesive filling part 13. The boot insertion port 17 enables insertion of the plurality of optical fibers 1. The optical fibers 1 inserted from the boot insertion port 17 pass through the adhesive filling part 13 and are inserted into the fiber holes 12.

As illustrated in FIG. 3A, the boot 20 is attached to the boot insertion port 17. The boot 20 is disposed so as to block the rear part of the adhesive filling part 13. This prevents the adhesive from leaking from the rear end of the ferrule 10. Meanwhile, contraction of the adhesive filled in the adhesive filling part 13 causes the ferrule 10 to deform. Simulation results of the amount of deformation of the ferrule 10 are described below.

FIG. 3B is an explanatory view of a first comparative example. FIGS. 17A and 17B are explanatory views of a simulation result of the deformation amount of the ferrule 10 in the first comparative example. Numerical values shown on the right side in FIGS. 17A and 17B indicate the deformation amount (the displacement amount) in an upward direction. FIG. 17A shows the simulation result in a cross section of the ferrule 10 viewed from the left side. FIG. 17B shows the simulation result of the right half of the ferrule 10 viewed from the front side.

The ferrule 10 of the first comparative example is different from one or more embodiments, in that it does not include the lower opening 132 on the lower surface of the ferrule 10 in the first comparative example. As shown in FIG. 17A, when the adhesive filled in the adhesive filling part 13 of the ferrule 10 in the first comparative example contracts as a result of hardening, the ferrule 10 deforms to be warped into a U-shape. Additionally, as shown in FIG. 17B, focusing on the right end of the connection end surface 10A, the region with a great deformation amount is distributed unevenly toward the upper edge. This shows that the ferrule 10 is likely to deform so as to warp into a U-shape also at the connection end surface 10A (i.e., the ferrule 10 is likely to deform so as to warp into a U-shape also when the ferrule 10 is viewed from the front side).

FIG. 3C is an explanatory view of a second comparative example. FIGS. 18A and 18B are explanatory views of a simulation result of the deformation amount of the ferrule 10 in the second comparative example.

The ferrule 10 in the second comparative example has a lower opening 132 in its lower surface. However, in the second comparative example, the ferrule 10 of the second comparative example is different from one or more embodiments, in that the lower opening 132 does not open at the location along the second surface 14B (the rear end surface of the stepped part 15) but opens at a location more toward the rear side than the second surface 14B. As shown in FIG. 18A, also in the second comparative example, when the adhesive filled in the adhesive filling part 13 of the ferrule 10 contracts, the ferrule 10 deforms so as to warp into a U-shape. (Note, however, that the deformation in the second comparative example is suppressed compared with the deformation in the first comparative example) Additionally, as shown in FIG. 18B, focusing on the right end of the connection end surface 10A, the region with a great deformation amount is distributed unevenly toward the upper edge also in the second comparative example. This shows that the ferrule 10 is likely to deform so as to warp into a U-shape also at the connection end surface 10A.

As shown in FIGS. 17B and 18B, in cases where the ferrule 10 is likely to deform so as to warp into a U-shape in the connection end surface 10A, the difference between the locations of the plurality of optical fibers 1 (the optical fibers 1 inserted in the fiber holes 12 opening in the connection end surface 10A) in the up-down direction is likely to increase. This may result in an increase in connection loss of optical signals (more specifically, an increase in maximum connection loss among the plurality of optical fibers 1).

FIGS. 4A and 4B are explanatory views of a simulation result of the deformation amount of the ferrule 10 in the first example.

As described already, the ferrule 10 in the first example has a lower opening 132 in its lower surface. Additionally, the upper opening 131 is disposed at the location along the first surface 14A of the inner wall 14 (i.e., the upper opening 131 is opened at the location along the first surface 14A), and the lower opening 132 is disposed at the location along the second surface 14B (the rear end surface of the stepped part 15) (i.e., the lower opening 132 is opened at the location along the second surface 14B). As shown in FIG. 4A, in the first example, when the adhesive filled in the adhesive filling part 13 of the ferrule 10 contracts, the ferrule 10 can be suppressed from deforming and warping into a U-shape, in comparison to the first comparative example and the second comparative example. Additionally, as shown in FIG. 4B, focusing on the right end of the connection end surface 10A, the regions with a great deformation amount are distributed substantially evenly to the top and the bottom, in comparison to the first comparative example and the second comparative example. This shows that the ferrule can be easily suppressed from deforming and warping into a U-shape also at the connection end surface 10A.

FIGS. 5A and 5B are explanatory views of a simulation result of a ferrule 10 in a modified example. In the ferrule 10 in the modified example, the dimension of the lower opening 132 in the front-rear direction is smaller than the ferrule 10 in the first example illustrated in FIGS. 3A and 4A. In other words, in the ferrule 10 in the modified example, the rear edge of the lower opening 132 is located toward the front side, compared to the ferrule 10 in the first example illustrated in FIGS. 3A and 4A. Thus, the dimension in the front-rear direction of the lower opening 132 of the ferrule 10 in the modified example shown in FIG. 5A is nearly the same as the dimension in the front-rear direction of the lower opening 132 of the ferrule 10 in the second comparative example shown in FIG. 18A.

As shown in FIG. 5A, also in the modified example, the upper opening 131 is opened at the location along the first surface 14A of the inner wall 14. Also, the lower opening 132 is opened at the location along the second surface 14B (the rear end surface of the stepped part 15). Moreover, as shown in FIG. 5A, also in the modified example, when the adhesive filled in the adhesive filling part 13 of the ferrule 10 contracts, the ferrule 10 can be suppressed from deforming and warping into a U-shape, in comparison to the first comparative example and the second comparative example. Furthermore, as shown in FIG. 5B, focusing on the right end of the connection end surface 10A, the regions with a great deformation amount are distributed substantially evenly to the top and the bottom, in comparison to the first comparative example and the second comparative example. This shows that the ferrule can be easily suppressed from deforming and warping into a U-shape also at the connection end surface 10A.

As shown in FIG. 4B (the first example) and FIG. 5B (the modified example of the first example), in cases where it is possible to suppress the connection end surface 10A of the ferrule 10 from deforming and warping into a U-shape, the difference between the locations of the plurality of optical fibers 1 (the optical fibers 1 inserted through the fiber holes 12 opening in the connection end surface 10A) in the up-down direction is reduced. As a result, it is possible to suppress connection losses of optical signals (more specifically, the maximum connection loss among the plurality of optical fibers 1).

More specifically, in ordinary cases, the array of optical fibers 1 will be distorted due to the distortion of the ferrule caused by the hardening and contraction of the adhesive. In contrast, according to one or more embodiments, the distortion occurring in the ferrule can be made line-symmetric with respect to the array of the optical fibers 1. As a result, the array of optical fibers 1 can be suppressed from getting distorted.

Note that, although the dimension of the lower opening 132 in the front-rear direction is different between the first example and the modified example, it is possible to suppress the connection end surface 10A from deforming and warping into a U-shape in both the first example and the modified example as shown in FIGS. 4B and 5B. On the other hand, although the dimension of the lower opening 132 in the front-rear direction is substantially the same between the modified example and the second comparative example, the ferrule 10 is likely to warp into a U-shape at the connection end surface 10A in the second comparative example as shown in FIG. 18B, whereas in the modified example as shown in FIG. 5B, the connection end surface 10A can be suppressed from deforming and warping into a U-shape. This means that, in order to suppress the connection end surface 10A from deforming and warping into a U-shape, it is effective that: the inner wall 14 of the ferrule 10 includes the first surface 14A and the second surface 14B that protrudes toward the adhesive filling part 13 from the first surface 14A; the upper opening 131 is opened at the location along the first surface 14A of the inner wall 14; and the lower opening 132 is opened at the location along the second surface 14B (the rear end surface of the stepped part 15), as described in the first example and the modified example.

Second Example

Figure 6:
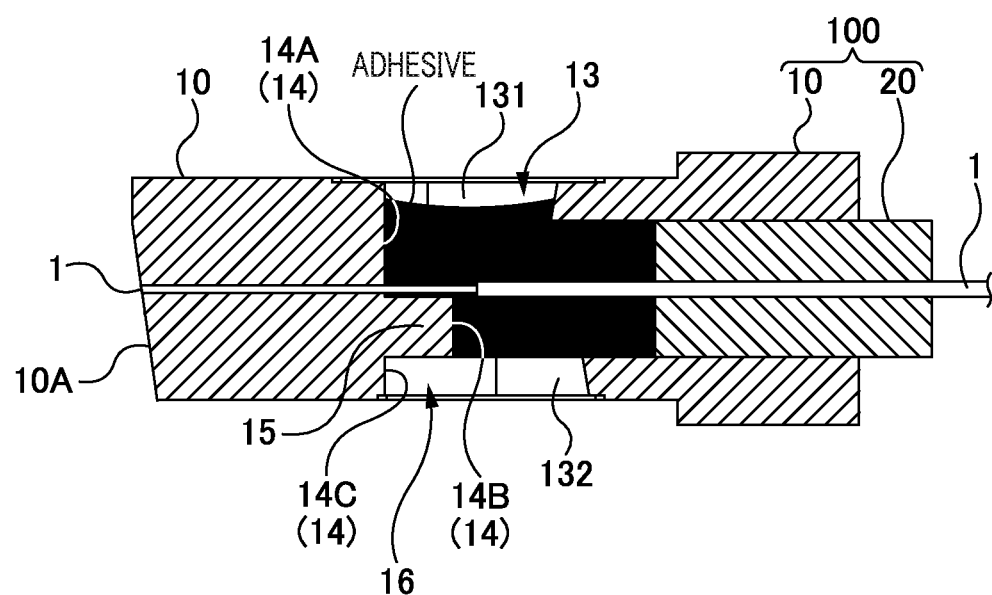
FIG. 6 is a cross-sectional view of a ferrule structure in a second example.

FIG. 6 is a cross-sectional view of a ferrule structure 100 in a second example.

As in the first example, the ferrule 10 in the second example includes a main body, an inner wall 14, an adhesive filling part 13, an upper opening 131, and a lower opening 132. Also, in the second example, the main body of the ferrule 10 includes a connection end surface 10A and an outer wall contiguous to the connection end surface 10A. The inner wall 14 includes respective openings of a plurality of fiber holes 12, and is disposed in the main body of the ferrule 10. The adhesive filling part 13 is disposed in the main body on the opposite side from the connection end surface 10A with respect to the inner wall 14. The adhesive material filling part 13 is configured to be filled with an adhesive. Furthermore, the upper opening 131 is an opening that opens through to the adhesive filling part 13 from the outer wall. The lower opening 132 is an opening that opens through to the adhesive filling part 13 from the outer wall of the ferrule 10. The lower opening 132 is disposed on the opposite side from the upper opening 131.

The second example includes a recessed part 16. The recessed part 16 is a recess located on the opposite side from the upper surface (the surface provided with guide grooves 15A) of a stepped part 15. In other words, the recessed part 16 is a recess provided on a lower side of the stepped part 15 (the side of the lower opening 132; the opposite side from the upper opening 131). The recessed part 16 has a shape in which the lower edge of a second surface 14B, which is the rear end surface of the stepped part 15, is recessed.

In the second example, the inner wall 14 of the ferrule 10 (the wall surface, among the wall surfaces constituting the adhesive filling part 13, that is on the side of the connection end surface 10A) includes a first surface, a second surface, and a third surface. The first surface is disposed along an edge of the upper opening 131 on the side of the connection end surface 10A (the front side). The upper opening 131 is opened at the location along the first surface 14A. The second surface is a surface that protrudes toward the adhesive filling part 13 (toward the rear side) from the first surface 14A, and is the rear end surface of the stepped part 15. The third surface 14C is constituted by a surface perpendicular to the fiber insertion direction as same as the second surface 14B. Note, however, that the third surface 14C is constituted by a surface of the recessed part 16 on the side of the connection end surface 10A (the front side). Thus, the third surface 14C is a surface disposed on the opposite side from the upper opening 131 with respect to the second surface 14B (i.e., the lower side), and is a surface disposed on the side of the connection end surface 10A (i.e., the front side) with respect to the second surface 14B.

FIGS. 7A and 7B are explanatory views of a simulation result of the deformation amount of the ferrule 10 in the second example.

As shown in FIG. 7A, in the second example, when the adhesive filled in the adhesive filling part 13 of the ferrule 10 contracts, the ferrule 10 can be suppressed from deforming and warping into a U-shape, in comparison to the first comparative example and the second comparative example. Additionally, as shown in FIG. 7B, focusing on the right end of the connection end surface 10A, the regions with a large amount of deformation are distributed substantially evenly to the top and the bottom, in comparison to the first comparative example and the second comparative example. This shows that the ferrule can be easily suppressed from deforming and warping into a U-shape also at the connection end surface 10A. For this reason, in order to suppress the connection end surface 10A from deforming and warping into a U-shape, it is effective that the inner wall 14 of the ferrule 10 includes: the first surface 14A along an edge of the upper opening 131 on the side of the connection end surface 10A (i.e., on the front side); the second surface 14B that protrudes toward the adhesive filling part 13 from the first surface 14A; and the third surface 14C that is disposed on the opposite side from the upper opening 131 (i.e., on the lower side) with respect to the second surface 14B and that is disposed on the side of the connection end surface 10A with respect to the second surface 14B, as described in the second example.

Incidentally, in cases where the stepped part 15 is provided inside the ferrule 10, the volume of the lower half in the up-down direction (the side on which the stepped part 15 is located) is usually larger than the volume of the upper half (that is, a volume difference between the upper half and the lower half of the ferrule 10 becomes large on the front side of the adhesive filling part 13). As a result, when the adhesive filled in the adhesive filling part 13 contracts, the lower half of the ferrule 10 is less likely to undergo displacement compared with the upper half, and thus the ferrule 10 is likely to deform in a manner warping into a U-shape.

In contrast, in the second example, since the recessed part 16 is provided on the lower side of the stepped part 15, the volume difference between the upper half and the lower half of the ferrule 10 is reduced as compared with cases where no recessed part 16 is provided. As a result, in the second example, when the adhesive filled in the adhesive filling part 13 contracts, the upper half and the lower half of the ferrule 10 are likely to deform evenly, compared with cases where no recessed part 16 is provided. Thus, the ferrule 10 can be suppressed from deforming and warping into a U-shape. Therefore, as described in the second example, in cases where the second surface is constituted by the rear end surface of the stepped part, it is effective to constitute the third surface by the end surface of the recessed part 16.

Third Example

In order to further suppress the deformation of the ferrule 10 due to contraction of the adhesive, it is desirable to reduce the amount of adhesive filled in the adhesive filling part 13. However, simply reducing the amount of adhesive may cause insufficient fixation of the optical fibers 1.

To deal with this, in a third example, a part of the boot 20 is disposed in opposition to the upper surface of the stepped part 15. With this configuration, the adhesive required to fix the optical fibers 1 can be applied around the optical fibers 1 while reducing the amount of adhesive filled in the adhesive filling part 13. This will be described below.

Figure 9:
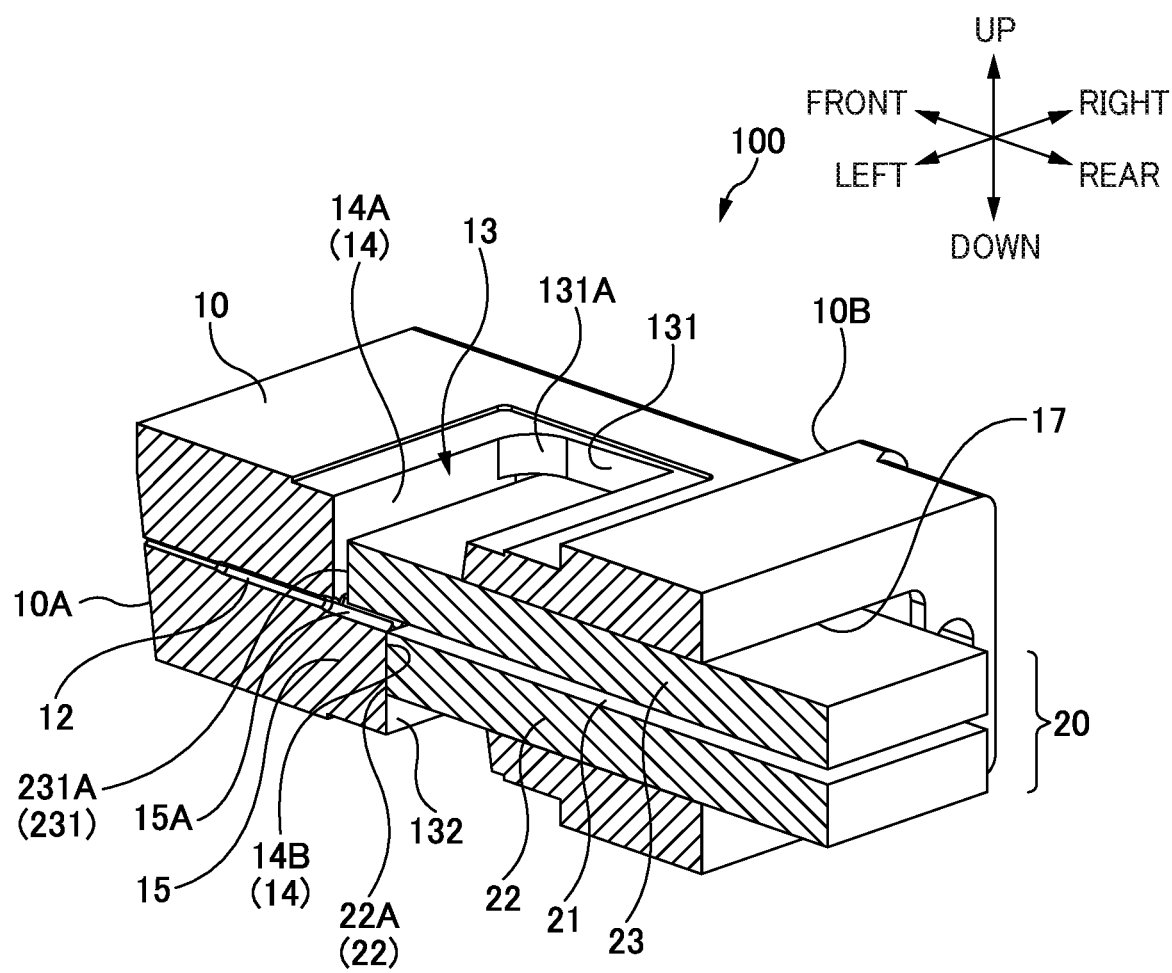
FIG. 9 is a cross-sectional perspective view of the ferrule structure in the third example.

FIG. 8A is a perspective view of a ferrule structure 100 in a third example. FIG. 8B is an exploded explanatory view of the ferrule structure 100 in the third example. FIG. 9 is a cross-sectional perspective view of the ferrule structure 100 in the third example. FIG. 10A is a top view of the ferrule structure 100 in the third example. FIG. 10B is a cross-sectional view of the ferrule structure 100 in the third example. Note that the dotted lines in FIG. 8A indicate an optical fiber ribbon constituted by a plurality of optical fibers 1.

Also, in the third example, the ferrule structure 100 includes a ferrule 10 and a boot 20. The ferrule 10 in the third example is the same as the ferrule 10 in the first example illustrated in FIGS. 1A and 1B. That is, the ferrule 10 in the third example includes: a main body including a connection end surface 10A, and an outer wall contiguous to the connection end surface 10A; an inner wall 14 disposed in the main body; an adhesive filling part 13; an upper opening 131; and a lower opening 132. The inner wall 14 has a first surface 14A and a second surface 14B. The upper opening 131 is disposed at the location along the first surface 14A (i.e., the upper opening 131 is opened at the location along the first surface 14A). The lower opening 132 is disposed at the location along the second surface 14B (i.e., the lower opening 132 is opened at the location along the second surface 14B). In the third example, an end part of the boot 20 is inserted to the interior of the adhesive filling part 13 by making use of the configuration that the boot insertion port 17 of the ferrule 10 is in communication with the adhesive filling part 13. Further, in the third example, the second surface 14B, which is the rear end surface of the stepped part 15, functions as an alignment surface for aligning the attachment direction of the boot 20 (the front-rear direction).

Figure 11:
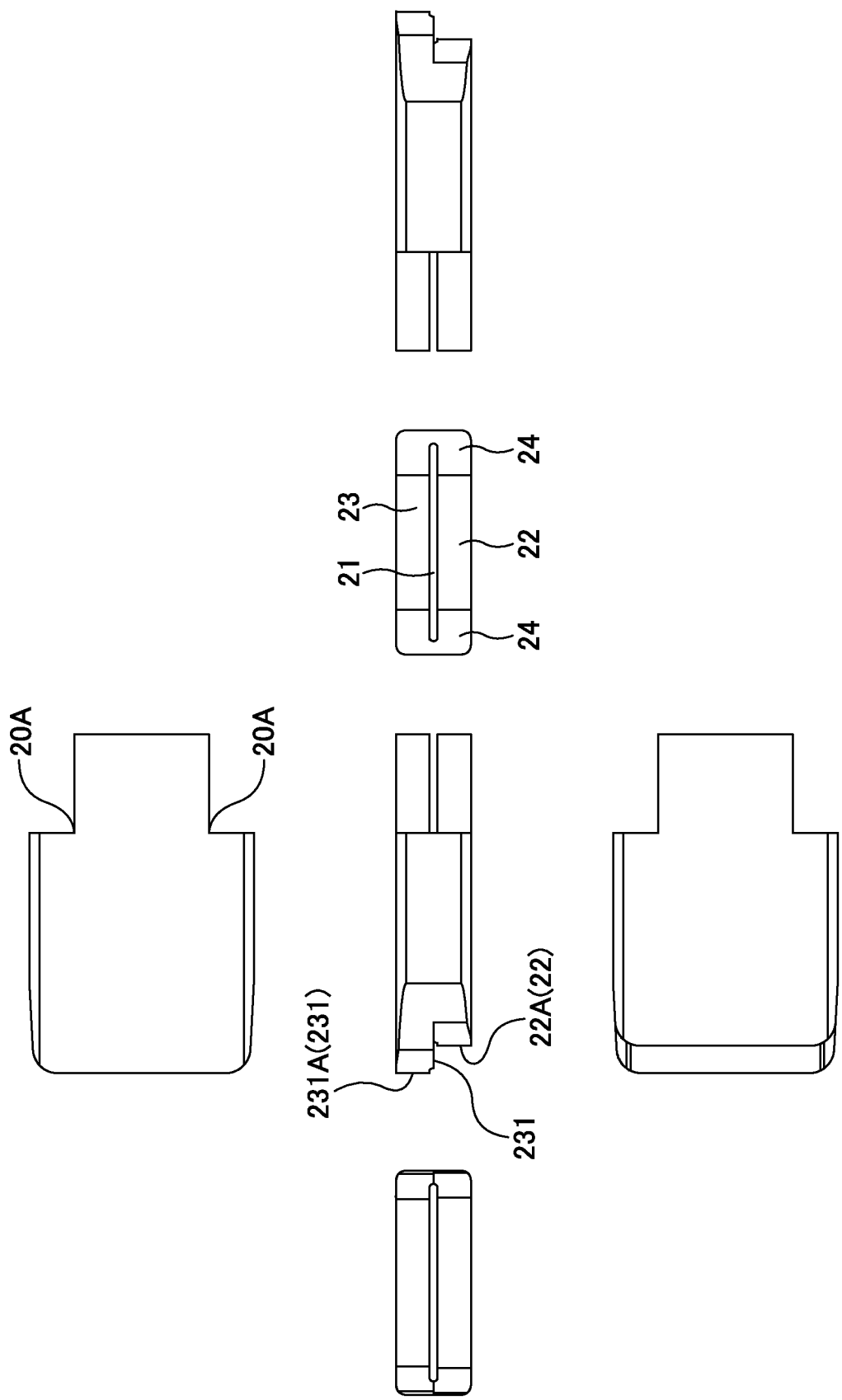
FIG. 11 illustrates orthographic projections of a boot in the third example taken from various directions.

FIG. 11 illustrates orthographic projections of the boot 20 in the third example taken from various directions. FIGS. 12A and 12B are perspective views of the boot 20 alone.

The boot 20 is a member that protects the optical fibers 1. The boot 20 is constituted by a flexible material (for example, resin) and is elastically deformable. Thus, the boot 20 can suppress load (for example, bending stress) applied to the plurality of optical fibers 1. As illustrated in FIGS. 9 and 10B, in a state where the boot 20 is attached to the ferrule 10, the central part of the boot 20 in the fiber insertion direction (the front-rear direction) is disposed so as to be sandwiched between upper and lower inner wall surfaces of the ferrule 10. In the third example, as illustrated in FIGS. 9 and 10B, a front-side part of the boot 20 (the boot's part more toward the front than the part sandwiched between the upper and lower inner wall surfaces of the ferrule 10) is disposed inside the adhesive filling part 13. A rear-side part of the boot located more toward the rear than the part sandwiched between the upper and lower inner wall surfaces of the ferrule 10 protrudes rearward from the ferrule 10 and constitutes a part (strain relief) that suppresses bending stress applied to the optical fibers 1.

The boot 20 includes a fiber insertion hole 21. The fiber insertion hole 21 is a through-hole configured to insert the plurality of optical fibers 1. Hence, the fiber insertion hole 21 is formed as a through-hole along the fiber insertion direction (the front-rear direction; the optical axis direction of the optical fibers 1). The fiber insertion hole 21 is formed such that an optical fiber ribbon constituted by the plurality of optical fibers 1 can be inserted. Hence, the fiber insertion hole 21 has a cross-sectional shape extending in the width direction (the left-right direction).

Moreover, the fiber insertion hole 21 is disposed in correspondence with the disposition of the fiber holes 12 of the ferrule 10. Hence, the fiber insertion hole 21 is disposed such that, in a state where the boot 20 is attached to the ferrule 10, it is aligned at the same height as the fiber holes 12 of the ferrule 10 and the upper surface of the stepped part 15 (or the guide grooves 15A).

The boot 20 includes a lower part 22 and an upper part 23. Note that the boot 20 has a shape in which the lower part 22 and the upper part 23, shaped as two blocks, are connected together at both ends in the width direction. In the descriptions below, the parts where the lower part 22 and the upper part 23 are connected on the outer sides of the fiber insertion hole 21 in the width direction may be referred to as connected parts 24. A space surrounded by the lower part 22, the upper part 23, and a pair of the connected parts 24 is the fiber insertion hole 21.

The lower part 22 is disposed on one side (the lower side or bottom side) with respect to the fiber insertion hole 21. In other words, in a state where the boot 20 is attached to the ferrule 10, the lower part 22 is disposed on the opposite side from the upper opening 131 side of the ferrule 10. The lower part 22 is a part having a block shape (a plate shape) constituting the lower side of the boot 20 and may be referred to as a "lower block" or a "first block". The lower part 22 is disposed at the bottom (lower side) of the adhesive filling part 13 to fill a space on the bottom side of the adhesive filling part 13.

The front-side end surface 22A of the lower part 22 is formed as a surface perpendicular to the fiber insertion direction (the attachment direction of the boot 20; the front-rear direction). The front-side end surface 22A of the lower part 22 serves as a contact surface that comes into contact with the second surface 14B of the inner wall 14 of the ferrule 10 (the rear end surface of the stepped part 15) and functions as an alignment surface for aligning the attachment direction of the boot 20 (the front-rear direction).

The upper part 23 is disposed on the other side with respect to the fiber insertion hole 21 (the upper side; the opposite side from the side of the lower part 22). In other words, the upper part 23 is disposed on the side of the upper opening 131 of the ferrule 10 in a state where the boot 20 is attached to the ferrule 10. The upper part 23 is a part having a block shape (a plate shape) constituting the upper side of the boot 20 and may be referred to as an "upper block" or a "second block". The upper part 23 fills a space on the upper side of the adhesive filling part 13.

The upper part 23 includes a protrusion part 231. The protrusion part 231 protrudes relative to the end surface 22A of the lower part 22 in the fiber insertion direction. The protrusion part 231 is disposed at the front-side end part of the upper part 23. The fiber insertion hole 21 is disposed in correspondence with the disposition of the fiber holes 12 of the ferrule 10. The protrusion part 231 protrudes toward the front relative to the end surface 22A of the lower part 22 (a part on the lower side of the fiber insertion hole 21). Accordingly, in a state where the boot 20 is attached to the ferrule 10, the protrusion part 231 opposes the upper surface of the stepped part 15 (or the guide grooves 15A) inside the adhesive filling part 13. More specifically, a lower surface of the protrusion part 231 serves as an opposition surface that opposes the upper surface of the stepped part 15. By disposing the protrusion part 231 in opposition to the upper surface of the stepped part 15 inside the adhesive filling part 13, the upper part 23 can fill the space of the adhesive filling part 13 that is on the side of the upper opening 131 (the upper side) with respect to the stepped part 15.

FIG. 13A is an enlarged cross-sectional view of the vicinity of a clearance between an end surface 231A of the protrusion part 231 and the first surface 14A of the ferrule 10. Note that, FIG. 13A is an enlarged explanatory view of region A in FIG. 10B.

The end surface 231A of the protrusion part 231 is disposed in opposition to the first surface 14A, which includes the openings of the fiber holes 12. Since the protrusion part 231 protrudes from the lower part 22, it is possible to reduce the clearance between the end surface 231A of the boot 20 (the protrusion part 231) and the first surface 14A, compared to cases where no protrusion part 231 is provided to the boot 20. The clearance between the end surface 231A of the protrusion part 231 and the first surface 14A opens upward in the upper opening 131. The adhesive is filled through this clearance. Once the adhesive is filled through the clearance which opens in the upper opening 131 (the clearance between the end surface 231A of the protrusion part 231 and the first surface 14A), the adhesive flows into the interior by capillary action (described later).

In one or more embodiments, the protrusion length of the protrusion part 231 protruding from the end surface 22A of the lower part 22 (protrusion length L2 illustrated in FIG. 14A; the dimension between the end surface 22A of the lower part 22 and the end surface 231A of the upper part 23 in the fiber insertion direction) is shorter than the length of the stepped part 15 in the fiber insertion direction (length L1 illustrated in FIG. 14A; the length of the guide grooves 15A; the dimension between the first surface 14A and the second surface 14B in the fiber insertion direction). In other words, the protrusion length L2 of the protrusion part 231 is less than the length L1 of the stepped part 15 in the fiber insertion direction (L2<L1). Thus, in a state where the end surface 22A of the lower part 22 of the boot 20 and the second surface 14B of the stepped part 15 are in contact with each other (see FIGS. 9 and 10B), it is possible to form a clearance for filling the adhesive between the end surface 231A of the protrusion part 231 and the first surface 14A of the ferrule 10 as illustrated in FIG. 13A. In one or more embodiments, since the protrusion length L2 of the protrusion part 231 is less than the length L1 of the stepped part 15 in the fiber insertion direction (L2<L1), it is possible to align the attachment direction of the boot 20 (the front-rear direction) with respect to the ferrule 10 by bringing the end surface 22A of the lower part 22 of the boot 20 in contact with the second surface 14B of the stepped part 15.

Incidentally, as illustrated in FIG. 13A (and FIG. 9), a retaining part 131A is disposed on the upper-side wall surface of the adhesive filling part 13 of the ferrule 10. The retaining part 131A holds down the protrusion part 231 of the boot 20 from the upper side. The retaining part 131A is located at both ends in the width direction in the vicinity of the front edge of the upper opening 131. In a state where the boot 20 is attached to the ferrule 10, the retaining part 131A is disposed on the upper side of both edges (both corners) in the width direction of the protrusion part 231 of the boot 20. In other words, the protrusion part 231 of the boot 20 is formed to be disposed on the lower side of the upper-side wall surface (the retaining part 131A) of the adhesive filling part 13 of the ferrule 10. By disposing the retaining part 131A on the upper side of the protrusion part 231 of the boot 20, it is possible to suppress the protrusion part 231 of the boot 20 from being displaced toward the upper side inside the adhesive filling part 13, and the protrusion part 231 can be disposed stably inside the adhesive filling part 13. Note that, the retaining part 131A is disposed on only the upper side of both edges, in the width direction, of the protrusion part 231 of the boot 20, and is not disposed on the upper side of the central part, in the width direction, of the protrusion part 231. Thus, as illustrated in FIG. 13A, the upper part of the clearance between the end surface 231A of the protrusion part 231 and the first surface 14A of the ferrule 10 can be opened, and the adhesive can be filled through this clearance. Note that, the ferrule 10 does not have to include the retaining part 131A.

FIG. 13B is an explanatory view of the protrusion part 231 in a modified example.

The protrusion part 231 in the modified example has an inclined surface 231B between the upper surface of the protrusion part 231 (the surface on the side of the upper opening 131) and the end surface 231A of the protrusion part 231. In other words, the protrusion part 231 in the modified example has an inclined surface 231B on an upper edge of the end surface 231A. Thus, the adhesive can be filled easily between the end surface 231A of the protrusion part 231 and the first surface 14A of the ferrule 10. Note that, as illustrated in FIG. 13B, also in cases where the protrusion part 231 is provided with the inclined surface 231B, it is preferable that the retaining part 131A of the ferrule 10 holds down the protrusion part 231 of the boot 20 from the upper side.

FIG. 14A is an enlarged view of the vicinity of the front end of the fiber insertion hole 21. FIG. 14B is an enlarged view of the vicinity of the front end of the fiber insertion hole 21 in a state where the optical fibers 1 have been inserted. Note that, FIG. 14A is an enlarged explanatory view of region B in FIG. 10B.

As illustrated in FIG. 14B, the fiber insertion hole 21 is formed so as to conform to the diameter of the optical fiber 1 having a coating. For example, the diameter of the optical fiber 1 (the outer diameter of the coating) is 250 µm, and the dimension of the fiber insertion hole 21 in the up-down direction (the clearance between the lower part 22 and the upper part 23) is 260 µm. Hence, the location, in the up-down direction, of the lower surface of the upper part 23 is substantially the same as the location of the upper edge of the optical fiber 1 (the optical fiber 1 having the coating) inserted through the fiber insertion hole 21. The tip (the front-side end part) of the optical fiber 1 is a bare optical fiber from which the coating has been removed. For example, the diameter of the bare optical fiber is 125 µm. A peeled edge 1A of the coating (i.e., the front end of the coating of the optical fiber 1) is disposed more toward the rear (toward the side of the boot insertion port 17) than the second surface 14B of the stepped part 15 (or the guide grooves 15A). Hence, as illustrated in FIG. 14B, the peeled edge 1A of the coating is disposed inside the fiber insertion hole 21. In this state, the bare optical fibers will extend out from the opening of the fiber insertion hole 21 toward the front side. Further, the bare optical fibers will be disposed above the upper surface of the stepped part 15 (the guide grooves 15A).

As illustrated in FIG. 14A, the lower surface of the protrusion part 231 constitutes an opposition surface that comes into opposition with the upper surface of the stepped part 15. Further, as illustrated in FIG. 14A, the lower surface of the protrusion part 231 is located on an extension of the upper edge of the fiber insertion hole 21. Since the fiber insertion hole 21 is formed so as to conform to the diameter of the optical fiber 1 having the coating, by locating the lower surface of the protrusion part 231 (the opposition surface that opposes the upper surface of the stepped part 15) on an extension of the upper edge of the fiber insertion hole 21 as in one or more embodiments, a clearance corresponding to the diameter of the optical fiber 1 having the coating is formed between the lower surface of the protrusion part 231 and the upper surface of the stepped part 15 (herein, the guide grooves 15A), as illustrated in FIG. 14A. When the bare optical fibers are disposed between the lower surface of the protrusion part 231 and the upper surface of the stepped part 15 (the guide grooves 15A), a narrow clearance amounting to the thickness of the coating will be formed around the bare optical fibers, as illustrated in FIG. 14B. Therefore, the adhesive can easily flow in around the bare optical fibers by capillary action.

As illustrated in FIG. 14B, the peeled edge 1A of the coating is disposed more toward the rear side (the side of the boot insertion port 17) than the second surface 14B of the stepped part 15 (or the guide grooves 15A). Hence, the coating's peeled edge is located inside the fiber insertion hole 21. As a result, as illustrated in FIG. 10B, when the ferrule structure 100 is viewed from the upper side, the peeled edge 1A of the coating is hidden by the upper part 23 of the boot 20, and it is impossible to confirm the position of the peeled edge 1A of the coating in the fiber insertion direction (the front-rear direction) from the upper opening 131. For this reason, it is preferable to provide an exposing part 232 to the boot 20, as described below.

FIGS. 15A and 15B are explanatory views of an exposing part 232.

The boot 20 illustrated in FIGS. 15A and 15B includes an exposing part 232. The exposing part 232 is configured to expose the upper side of the optical fibers 1 inserted through the fiber insertion hole 21. The exposing part 232 is disposed more toward the rear than the front-side end surface 22A of the lower part 22. In other words, in a state where the boot 20 is attached to the ferrule 10, the exposing part 232 is disposed more toward the rear than the second surface 14B of the stepped part 15 (or the guide grooves 15A). Also, in a state where the boot 20 is attached to the ferrule 10, the exposing part 232 is disposed more toward the front than a rear edge of the upper opening 131. With this configuration—wherein the exposing part 232 is disposed between the second surface 14B of the stepped part 15 (or the guide grooves 15A) and the rear edge of the upper opening 131 in a state where the boot 20 is attached to the ferrule 10—it is possible to confirm the position of the coating's peeled edge 1A in the fiber insertion direction (the front-rear direction) from the upper opening 131 via the exposing part 232, as illustrated in FIGS. 15A and 15B.

Note that, the exposing part 232 may have any shape as long as it is possible to expose the upper side of some of the optical fibers 1 among the plurality of optical fibers 1 inserted through the fiber insertion hole 21. This is because, since the coating of the optical fiber ribbon is removed in such a manner that the positions of the coating's peeled edges 1A of the respective optical fibers 1 are aligned, it is sufficient if it is possible to confirm the position, in the fiber insertion direction, of the coating's peeled edge 1A of at least some of the optical fibers 1. Therefore, the exposing part 232 does not have to expose the upper side of all the optical fibers 1.

As illustrated in FIG. 15A, the exposing part 232 can be formed as a recessed part located on an end part of the boot 20 in the width direction. With the exposing part 232 illustrated in FIG. 15A, it is possible to confirm the position, in the fiber insertion direction, of the coating's peeled edge 1A of the optical fiber 1 located at the end part of the fiber insertion hole 21 in the width direction. Further, as illustrated in FIG. 15A, it is preferable that both ends in the width direction are each provided with the recessed part. In this way, it is possible to confirm the positions, in the fiber insertion direction, of the coating's peeled edge 1A of the optical fibers 1 located at both ends in the width direction. As a result, it is possible to estimate that the peeled edges 1A of the other optical fibers 1 (the optical fibers 1 located in the central part in the width direction) are positioned on a line connecting the peeled edges 1A located at both ends.

As illustrated in FIG. 15B, the exposing part 232 can be formed as a window (an opening) located in the central part of the boot 20 in the width direction. With the exposing part 232 illustrated in FIG. 15B, it is possible to confirm the positions, in the fiber insertion direction, of the coating's peeled edge 1A of the optical fibers 1 located in the central part of the fiber insertion hole 21 in the width direction. As illustrated in FIG. 15B, by locating the exposing part 232 in the central part of the boot 20 in the width direction, the coating's peeled edge 1A of the optical fibers 1 can be confirmed in the central part of the upper opening 131 in the width direction. This facilitates the operator's confirmation work. Further, locating the exposing part 232 in the central part of the boot 20 in the width direction, as illustrated in FIG. 15B, achieves a structure with which the protrusion part 231 of the boot 20 can be easily disposed on the lower side of the retaining part 131A of the ferrule 10.

As illustrated in FIGS. 8A and 8B, the boot 20 in the third example includes a recessed part 20A. The recessed part 20A is a recess located in a rear part of the boot 20. As illustrated in FIG. 10A, in a state where the boot 20 is attached to the ferrule 10, the recessed part 20A is located more toward the front than the rear end surface of the ferrule 10. Thus, when the adhesive filled in the adhesive filling part 13 flows into the interior of the ferrule 10 (described later), it is possible to suppress the adhesive from leaking toward the rear of the rear end surface of the ferrule 10, even if the adhesive flows in between the boot insertion port 17 of the ferrule 10 and the boot 20. Note, however, that the boot 20 does not have to include the recessed part 20A.

Manufacturing Method:

FIGS. 16A to 16D are explanatory views of a method for manufacturing a ferrule-equipped fiber.

First, an operator prepares a ferrule 10 and a boot 20 individually. Note that, as already described, the ferrule 10 includes: a main body including a connection end surface 10A, and an outer wall contiguous to the connection end surface 10A; an inner wall 14 disposed in the main body; an adhesive filling part 13; an upper opening 131; and a lower opening 132. The inner wall 14 has a first surface 14A and a second surface 14B. The upper opening 131 is disposed at the location along the first surface 14A (i.e., the upper opening 131 is opened at the location along the first surface 14A). The lower opening 132 is disposed at the location along the second surface 14B (i.e., the lower opening 132 is opened at the location along the second surface 14B). Moreover, as described already, the boot 20 includes: a fiber insertion hole 21; a lower part 22 disposed on one side with respect to the fiber insertion hole 21; and an upper part 23 disposed on the other side with respect to the fiber insertion hole 21. Furthermore, the upper part 23 includes a protrusion part 231 that protrudes relative to the end surface 22A of the lower part 22 in the fiber insertion direction.

The operator performs pretreatment on a plurality of optical fibers 1. For example, as a pretreatment for the optical fibers 1, the operator removes the coating of the optical fiber ribbon (i.e., removes the coating of each of the optical fibers 1) and cuts the bare optical fibers such that the bare optical fibers have a predetermined length.

Next, as illustrated in FIG. 16A, the operator inserts the plurality of optical fibers 1 (the optical fiber ribbon) into the fiber insertion hole 21 of the boot 20. Note that, the operator inserts the plurality of optical fibers 1 (the optical fiber ribbon) into the boot 20 such that the tips of the optical fibers 1 (the bare optical fibers) protrude more toward the front than the protrusion part 231 of the boot 20.

Further, as illustrated in FIG. 16A, the operator applies an adhesive in the vicinity of the opening of each fiber hole 12 on the side of the adhesive filling part 13, to thereby apply the adhesive to the fiber holes 12. Note that, the operator may apply the adhesive to the interior of the fiber holes 12 by first applying the adhesive in the vicinity of the opening of each fiber hole 12 on the side of the adhesive filling part 13 and then sucking the adhesive from the side of the connection end surface 10A of the ferrule 10. By applying the adhesive to the fiber holes 12 in advance, it is possible to suppress air bubbles from entering the fiber holes 12.

Next, as illustrated in FIG. 16B, the operator inserts the plurality of optical fibers 1, which have been passed through the boot 20, respectively into the corresponding fiber holes 12 of the ferrule 10. In this process, the operator inserts the optical fibers 1 into the fiber holes 12 while guiding the optical fibers 1 by the upper surface of the stepped part 15 of the ferrule 10 (herein, the respective guide grooves 15A).

Next, as illustrated in FIG. 16C, the operator inserts the boot 20 into the boot insertion port 17 of the ferrule 10, to attach the boot 20 to the ferrule 10. In this process, as illustrated in FIG. 16C, the operator inserts the boot 20 into the ferrule 10 until the end surface 22A of the lower part 22 of the boot 20 is placed in contact with the second surface 14B of the stepped part 15 of the ferrule 10. When the end surface 22A of the lower part 22 of the boot 20 comes into contact with the second surface 14B of the stepped part 15 of the ferrule 10, a clearance is formed through which the adhesive can be introduced between the end surface 231A of the protrusion part 231 and the first surface 14A of the ferrule 10. Further, the lower surface of the protrusion part 231 is disposed in opposition to the upper surface of the stepped part 15, thus forming therebetween a clearance roughly the diameter of the optical fiber 1 (see FIGS. 14A and 14B).

Note that, in this process, the operator disposes both edges (both corners), in the width direction, of the protrusion part 231 of the boot 20 on the lower side of the upper-side wall surface (the retaining part 131A) of the adhesive filling part 13 of the ferrule 10. In cases where the boot 20 includes the exposing part 232 (see FIGS. 15A and 15B), the operator can confirm the position of the peeled edge 1A of the coating in the fiber insertion direction (front-rear direction) from the upper opening 131 via the exposing part 232 after the boot 20 is attached to the ferrule 10.

Next, as illustrated in FIG. 16D, the operator applies the adhesive to the clearance between the end surface 231A of the protrusion part 231 and the first surface 14A of the ferrule 10. The adhesive applied to the clearance flows into the interior by capillary action, and thus, the adhesive is applied to the guide grooves 15A and around the optical fibers 1 disposed in the guide grooves 15A. After the application of the adhesive, the adhesive is hardened, and thereby the optical fibers 1 are fixed to the ferrule 10, thus completing the manufacturing of the ferrule-equipped fiber.

In one or more embodiments, the boot 20 is disposed inside the adhesive filling part 13. Thus, it is possible to reduce the amount of adhesive filled into the adhesive filling part 13, and as a result, it is possible to suppress deformation of the ferrule 10 even if the adhesive contracts when the adhesive is hardened.

Further, in one or more embodiments, the boot 20 includes the protrusion part 231. Thus, the clearance between the protrusion part 231 of the boot 20 and the first surface 14A of the ferrule 10 can be narrowed, thus enabling the adhesive to easily flow into the interior by capillary action. In addition, in one or more embodiments, it is possible to narrow the clearance between the lower surface of the protrusion part 231 and the upper surface of the stepped part 15 (or the guide grooves 15A), and it is also possible to narrow the clearance around the optical fibers 1 (the bare optical fibers) disposed above the upper surface of the stepped part 15. Thus, the adhesive can easily spread over the upper surface of the stepped part 15 and around the optical fibers 1 disposed above the upper surface of the stepped part 15 by capillary action. Thus, in one or more embodiments, even if the amount of adhesive is small, it is possible to apply the adhesive onto the upper surface of the stepped part 15 and around the optical fibers 1, which makes it possible to fix the optical fibers to the ferrule with an adequate strength.

Note that, the ferrule 10 of the third example may employ the ferrule 10 of the second example illustrated in FIG. 6, instead of the ferrule 10 of the first example. In this case, the ferrule 10 of the third example will include: a main body including a connection end surface 10A, and an outer wall contiguous to the connection end surface 10A; an inner wall 14 disposed in the main body; an adhesive filling part 13; an upper opening 131; and a lower opening 132. The inner wall 14 has: a first surface 14A along an edge of the upper opening 131 on the side of the connection end surface 10A (on the front side); a second surface 14B that protrudes toward the adhesive filling part (toward the rear) from the first surface 14A; and a third surface 14C disposed on the opposite side (on the lower side) from the upper opening 131 with respect to the second surface 14B, the third surface being disposed on the side of the connection end surface 10A (on the front side) with respect to the second surface 14B. Also in this case, the end part of the boot 20 is inserted to the interior of the adhesive filling part 13 by making use of the configuration that the boot insertion port 17 of the ferrule 10 is in communication with the adhesive filling part 13. Further, also in this case, the second surface 14B functions as an alignment surface for aligning the attachment direction of the boot 20 (the front-rear direction).

Other Embodiments

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

DESCRIPTION OF THE REFERENCE NUMERAL

1: Optical fiber;
1A: Peeled edge;
10: Ferrule;
10A: Connection end surface;
10B: Flange part;
11: Guide hole;
12: Fiber hole;
13: Adhesive filling part;
131: Upper opening;
131A: Retaining part;
132: Lower opening;
14: Inner wall;
14A: First surface;
14B: Second surface;
14C: Third surface;
15: Stepped part;
15A: Guide groove;
16: Recessed part;
17: Boot insertion port;
20: Boot;
20A: Recessed part;
21: Fiber insertion hole;
22: Lower part;
22A: End surface;
23: Upper part;
231: Protrusion part;
231A: End surface;
231B: Inclined surface;
232: Exposing part;
24: Connected part;
100: Ferrule structure.

The invention claimed is:

1. A ferrule structure comprising:
   a ferrule comprising:
     a main body including an inner wall, an outer wall, and a connection end surface at which a tip of an optical fiber is to be disposed, wherein the inner wall has fiber holes through which the optical fiber is inserted toward the connection end surface;
     an adhesive filling part disposed in the main body on an opposite side from the connection end surface with respect to the inner wall;
     an upper opening that opens from the outer wall to the adhesive filling part; and
     a lower opening that opens from the outer wall to the adhesive filling part and is disposed on an opposite side from the upper opening, wherein
     the inner wall has a first surface and a second surface protruding toward the adhesive filling part from the first surface,
     the upper opening is opened in a location along the first surface, and
     the lower opening is opened in a location along the second surface; and
   a boot attached to the ferrule and including:
     a fiber insertion hole through which optical fibers are inserted and that is disposed in correspondence with a disposition of the fiber holes;
     a lower part that is disposed on one side with respect to the fiber insertion hole and is in contact with the second surface; and
     an upper part disposed on another side with respect to the fiber insertion hole and including a protrusion part protruding relative to an end surface of the lower part in a fiber insertion direction.

2. The ferrule structure according to claim 1, wherein a protrusion length of the protrusion part is less than a dimension between the first surface and the second surface in the fiber insertion direction.

3. The ferrule structure according to claim 1, wherein
   the ferrule includes a retaining part in the upper opening, and
   the protrusion part is disposed on a lower side of the retaining part.

4. A ferrule structure comprising:
   a ferrule comprising:
     a main body including an inner wall, an outer wall, and a connection end surface at which a tip of an optical fiber is to be disposed, wherein the inner wall has fiber holes through which the optical fiber is inserted toward the connection end surface;

an adhesive filling part disposed in the main body on an opposite side from the connection end surface with respect to the inner wall;

an upper opening that opens from the outer wall to the adhesive filling part; and a lower opening that opens from the outer wall to the adhesive filling part and is disposed on an opposite side from the upper opening, wherein the inner wall has:
- a first surface along an edge of the upper opening on a side of the connection end surface;
- a second surface protruding toward the adhesive filling part from the first surface; and
- a third surface disposed on an opposite side from the upper opening with respect to the second surface and on the side of the connection end surface with respect to the second surface; and a boot attached to the ferrule and including:
- a fiber insertion hole through which optical fibers are inserted and that is disposed in correspondence with a disposition of the fiber holes;
- a lower part that is disposed on one side with respect to the fiber insertion hole and is in contact with the second surface; and
- an upper part disposed on another side with respect to the fiber insertion hole and including a protrusion part protruding relative to an end surface of the lower part in a fiber insertion direction.

5. The ferrule structure according to claim 4, wherein a protrusion length of the protrusion part is less than a dimension between the first surface and the second surface in the fiber insertion direction.

6. The ferrule structure according to claim 4, wherein
the ferrule includes a retaining part in the upper opening, and
the protrusion part is disposed on a lower side of the retaining part.

7. The ferrule structure according to claim 4, further comprising:
- a stepped part that guides the optical fiber to the fiber holes in the main body; and
- a recessed part positioned on an opposite side from the upper opening with respect to the stepped part, wherein
the second surface is constituted by an end surface of the stepped part, and
the third surface is constituted by an end surface of the recessed part.

* * * * *